US012520938B2

(12) United States Patent
Bauman

(10) Patent No.: US 12,520,938 B2
(45) Date of Patent: Jan. 13, 2026

(54) SELF-SECURING RETENTION APPARATUS

(71) Applicant: Sportsman Necessities LLC, Ste. Genevieve, MO (US)

(72) Inventor: Brian Delbert Bauman, Ste. Genevieve, MO (US)

(73) Assignee: Sportsman Necessities LLC, Ste. Genevieve, MO (US)

( * ) Notice: Subject to any disclaimer, the term of this patent is extended or adjusted under 35 U.S.C. 154(b) by 0 days.

(21) Appl. No.: 18/399,286

(22) Filed: Dec. 28, 2023

(65) Prior Publication Data

US 2024/0215718 A1 Jul. 4, 2024

Related U.S. Application Data

(60) Provisional application No. 63/435,736, filed on Dec. 28, 2022.

(51) Int. Cl.

*A47B 81/00* (2006.01)
*F16M 11/04* (2006.01)
*F16M 11/12* (2006.01)

(52) U.S. Cl.

CPC ......... *A47B 81/005* (2013.01); *F16M 11/046* (2013.01); *F16M 11/126* (2013.01)

(58) Field of Classification Search

CPC .... A47B 81/005; A47B 81/00; F16M 11/046; F16M 11/126; F41A 23/18; B60R 7/14; F41C 33/06

See application file for complete search history.

(56) References Cited

U.S. PATENT DOCUMENTS 2,158,623 A * 5/1939 Fischbacher ......... A47B 81/005 211/180
2,302,170 A * 11/1942 Basler .................... A47G 29/18 248/311.2
3,917,071 A * 11/1975 Walters ................... E05B 73/00 248/553
3,952,878 A * 4/1976 Gorham .................. F41A 23/18 248/161
4,113,107 A * 9/1978 Jaeger ..................... F41A 17/02 211/64
4,132,315 A * 1/1979 Young ..................... E05B 73/00 211/64
4,144,971 A * 3/1979 Balibrea ................. F41A 23/18 248/156
4,450,989 A * 5/1984 Bogar, Jr. ............ A47B 81/005 224/571

(Continued)

*Primary Examiner* — Patrick D Hawn

(74) *Attorney, Agent, or Firm* — Thompson Coburn LLP

(57) ABSTRACT

A retention apparatus is disclosed that can secure an instrument within the retention apparatus. The retention apparatus may have a receptacle for placement of the instrument, and the instrument may be an elongated instrument. When placed within the receptacle, the instrument may move the receptacle from a first position to a second position. Movement of the receptacle may cause movement of a rod of the retention apparatus that in turn may move a grasping mechanism of the retention apparatus from an open position to a closed position. After placement in the receptacle, the instrument made remain self-secured by the receptacle and the grasping mechanism of the retention apparatus until removal of the instrument is desired by the user.

9 Claims, 30 Drawing Sheets

(56) References Cited

U.S. PATENT DOCUMENTS

| | | | | |
|---|---|---|---|---|
| 5,680,939 | A * | 10/1997 | Oliver | A47B 81/005 248/161 |
| 5,819,462 | A * | 10/1998 | Dockery | A47B 81/005 211/64 |
| 6,935,065 | B1 * | 8/2005 | Oliver | F41A 23/04 248/161 |
| 7,137,511 | B1 * | 11/2006 | Crowell | F41A 23/18 248/176.1 |
| 8,678,206 | B2 * | 3/2014 | Kubiniec | F41A 23/18 211/64 |
| 8,910,560 | B2 * | 12/2014 | Irwin | B60R 7/14 42/70.11 |
| 9,198,512 | B1 * | 12/2015 | Moayeri | A47B 81/005 |
| 9,708,835 | B2 * | 7/2017 | Fisher | E05B 73/0041 |
| 9,884,593 | B2 * | 2/2018 | Hull | B60R 7/14 |
| 10,144,358 | B2 * | 12/2018 | Fife | A47F 5/08 |
| 10,473,425 | B2 * | 11/2019 | Gorton | F41C 33/005 |
| 10,791,830 | B2 * | 10/2020 | Lee | G01L 5/00 |
| 11,110,867 | B2 * | 9/2021 | Franklin | A47F 7/0028 |
| 11,326,851 | B1 * | 5/2022 | Oldham | A47B 81/005 |
| 11,484,139 | B1 * | 11/2022 | Hagberg | F41A 23/18 |
| 11,878,656 | B2 * | 1/2024 | Mueller | F41A 23/18 |
| 11,889,918 | B2 * | 2/2024 | Erbil | F41A 23/005 |
| 2002/0139759 | A1 * | 10/2002 | Carney | H05K 7/1429 211/26 |
| 2007/0170128 | A1 * | 7/2007 | Punzel | A47B 81/005 211/64 |
| 2008/0252414 | A1 * | 10/2008 | Crigger | G07C 9/253 211/64 |
| 2013/0061514 | A1 * | 3/2013 | Smith | A01K 97/10 43/54.1 |
| 2015/0069103 | A1 * | 3/2015 | Fife | B60R 7/14 224/555 |
| 2015/0128668 | A1 * | 5/2015 | Meredith | F41A 23/18 70/266 |
| 2017/0332783 | A1 * | 11/2017 | Setina | B60R 7/14 |
| 2017/0350672 | A1 * | 12/2017 | Masteller | B60R 7/14 |
| 2017/0361777 | A1 * | 12/2017 | Bornais | B60R 7/14 |
| 2018/0170268 | A1 * | 6/2018 | Fisher | B60R 7/14 |
| 2019/0063871 | A1 * | 2/2019 | Cain | F41C 33/06 |

* cited by examiner

SELF-SECURING RETENTION APPARATUS

CROSS-REFERENCE AND PRIORITY CLAIM TO RELATED PATENT APPLICATIONS

This US non-provisional patent application claims priority to U.S. provisional patent application 63/435,736, filed Dec. 28, 2022, and titled "Self-latching Gun Rest, which utilizes the weight of the firearm or tool to actuate Latching Hooks", the entire disclosure of which is incorporated herein by reference.

INTRODUCTION

Safe storage of items or tools is an essential part of ownership of such products. While all items or tools have a set or envisioned operational use, such use is not always continuous. Thus, when these items are not in use a proper storage location and proper storage location and mechanism is needed. Further, there may be times and situations where storage of the item or tool is needed outside of a normal storage facility. This is more important when the item or tool to be stored properly may be an item having dangerous attributes or functionality. For example, storage of a firearm may be an item where proper and safe storage is of more importance than other general tools.

While there exist some firearm storage mechanisms on the market, they are not ideal for multiple situational uses. There may be some situations where not only a firearm should be safely stored, but it should also be able to be quickly accessed from the storage position for use and done so in a safe manner. While some storage devices are present within the marketplace, these storage devices are limited by manual storage or locking mechanisms that lack any quick release mechanism often required in a hunting or quick access scenario. For example, hunting blinds, closets and open walls lack any mechanism to safely store long guns or firearms. Most hunting blinds have no device to safely store long guns or firearms other than a notch in a board or corner. The long gun or firearm can easily be knocked over causing a firearm discharge safety hazard. Most gun/tool racks lack latching/locking mechanisms, which the invention remedies.

While there exist storage systems or rests within the marketplace, none combine full secure encapsulation of the long gun, tool, or firearm and quick access and release of the long gun, tool, or firearm in one solution. Some may employ magnets, which allow a release but not full secure encapsulation, or quick, which still allows for accidental dismounting. Others may use locking cylinder devices, which will not allow for quick access and release of the long gun, tool, or firearm. The following disclosure by the inventor of the disclosed retention apparatus proposes a solution to meet these shortcomings and offers a novel approach to solve these issues that is not available or present within the marketplace.

The disclosed retention apparatus described herein solves these problems with a unique mechanism that converts lever force to linear actuation to rotational motion, all promoted by the weight of the long gun, tool, or firearm being lowered or raised on the disclosed retention apparatus. The disclosed retention apparatus improves upon any non-safe method for safely storing a long gun or other handled tool currently employed within the industry. Whether it be in a hunting blind, storage closet or along a wall, the retention apparatus improves safety over leaning a long gun or firearm against an open notch, corner, or edge by securely enclosing the long gun, tool, or firearm within a grasping mechanism of the retention apparatus. Yet, while the retention apparatus safely secures these items, the retention apparatus still allows quick release access when the long gun, tool, or firearm is lifted vertically thereby highly reducing the chance of the long gun, tool, or firearm falling over and resulting in potential discharge and/or injury/death.

Further features and advantages of the disclosed embodiments, as well as the structure and operation of various elements of the disclosed embodiments, are described in detail below with reference to the accompanying drawings.

BRIEF DESCRIPTION OF THE DRAWINGS

The accompanying drawings, which are incorporated in and form a part of the specification, illustrate the disclosed embodiments and, together with the description, serve to explain certain inventive principles. In the drawings.

DETAILED DESCRIPTION OF EXAMPLE EMBODIMENTS

The foregoing and other features and advantages of the invention will become more apparent from the following detailed description of exemplary embodiments, read in conjunction with the accompanying drawings. The detailed description and drawings are merely illustrative of the present disclosure rather than limiting, the scope of the invention being defined by the appended claims and equivalents thereof.

Figure 1:
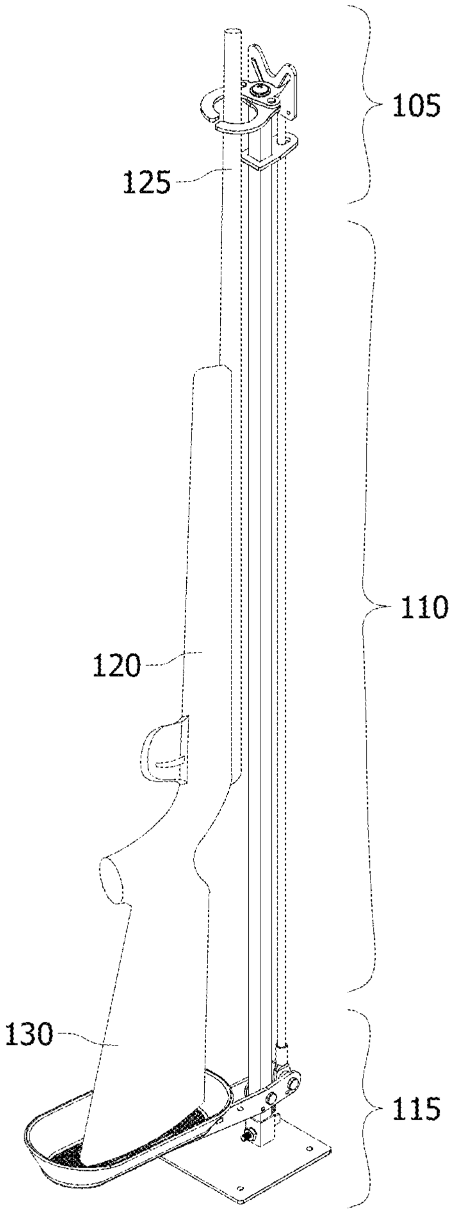
FIG. 1 illustrates an example retention apparatus in a closed position securing an elongated instrument in accordance with an embodiment of the disclosure.

Referring to the accompanying drawings, FIG. 1 illustrates an example retention apparatus 100. The retention apparatus 100 itself may be constructed by several types of manufacturing processes and made of several types of materials. For example, various metals or metallic alloys may be used to create the component parts of the retention apparatus 100 by way of custom cutting these metals or metallic alloys when they are presented in the form of a sheet. The cutting of these materials may be mechanical in nature or may employ use of a laser cutting beam to create the desired cut outs sheet to be formed into a specific component part. The components of the retention apparatus 100 after cutting, may then be folded appropriately with a metal fabrication tool or process to create the desired component. Alternatively, the components of the retention apparatus 100 may also be created by way of injection molding with the use of polymer or plastic type materials. Further, prefabrication metallic structures such as but not limited metallic tubing may be used for selecting component pieces of the retention apparatus 100. Some components of the retention apparatus 100 may include other materials such as rubbers, or other moldable or protective materials. It is also envisioned that the components of the retention apparatus 100 may be coated with necessary protective layering which may consist of a second type of material to protect the components of the retention apparatus 100. As the retention apparatus 100 is to be employed generally in an outdoor environment, these possible secondary coating may assist in the longevity and protection of the retention apparatus 100 against a range of thermal temperature distributions and the outdoor elements to protect the retention apparatus 100 from damage. Complete assembly of the retention apparatus 100 may include, for example, the use of appropriate or like fastener and movement materials like springs, washers, screws, stand-offs, bolts, nuts, or the like. These types of component materials of the retention apparatus 100 may be fabricated, welded, or assembled by normal industry methods and manufacturing means.

The retention apparatus 100 of FIG. 1 may have a plurality of portions sections. A top portion 105 of the retention apparatus 100 can be viewed the greatest distance from the ground surface on which the retention apparatus 100 may be placed or may rest. The top portion 105 may be a location where securing components to create a securing type of mechanism may be placed on the retention apparatus 100. Below the top portion 105, a middle portion 110 of the retention apparatus 100 may be present. The middle portion 110 of the retention apparatus 100 extends vertically upwards from a bottom portion 115 of the retention apparatus 100 to the top portion 105 of the retention apparatus 100. The middle portion 110 may generally be of a greater longitudinal length than either the top portion 105 or the bottom portion 115. However, it should be understood that the middle portion 110 may be adjusted as appropriate to fit the size of a possible item to be secured by the retention apparatus 100. Below the middle portion 110, the bottom portion 115 of the retention apparatus 100 may be present. The bottom portion 115 of the retention apparatus 100 may include both a retention type vessel to contain a part of an item to be secured by the retention apparatus 100 and a base portion that may rest or be secured to a ground or surface below the base portion of the retention apparatus 100. Further, an interconnection of communicative operational components may be employed throughout the retention apparatus 100. Thus, in some envisioned embodiments, movement of the bottom portion 115 components may facilitate movement of the middle portion 110 components that would then facilitate movement of the top portion 105 components of the retention apparatus 100.

The example retention apparatus 100 shown in FIG. 1, is viewed in a securing position or a locking position of operation. The retention apparatus 100 is envisioned to have a plurality of operational positions. One possible operational position would be an open position. In the open position the retention apparatus 100 can accept and then later secure an elongated instrument 120 to be secured by the retention apparatus 100. The elongated instrument 120 may be any type of product generally having a large length that requires some type of securing operation at opposite ends to safely secure the elongated instrument 120. For example, the elongated instrument 120 may be a firearm such as a rifle, long barrel rifle, or a shotgun. In other embodiments, the elongated instrument 120 may be a tool such as a gardening tool like a rake, shovel, or hoe, or a working tool such as a hammer or axe. Multiple items of various operational uses can present as the elongated tool 120, and the retention apparatus 100, by way of the middle portion 110 and any possible modifications, can be used to accommodate any various size limitations of the elongated instrument 120.

The elongated instrument 120 may have a top end 125 and a bottom end 130. The retention apparatus 100, when placed in the open position, can accommodate, and secure the elongated instrument 120 through the combination of placement of connective operational features. To secure the elongated instrument 120 and place the retention apparatus 100 into the securing position, the bottom end 130 elongated instrument 120 may be placed within the retention type vessel of the bottom portion 115 of the retention apparatus 100. Then, the top end 125 of the elongated instrument 120 may be positionally located approximate the securing type of mechanism located at the top portion 105 of the retention apparatus 100. The weight of the elongated instrument 120 may lower the bottom portion 115 of the retention apparatus 100. Lowering of the bottom portion 115 may cause interactive movement communication via a set of actions by components of each the bottom portion 115, middle portion 110, and top portion 105 of the retention apparatus 100 such that the securing type of mechanism located at the top portion 105 of the retention apparatus 100 may grasp and secure the top end 125 of the elongated instrument 120. In this manner, the retention apparatus 100 secures the elongated instrument 120. Further, the retention apparatus 100 self-secures and continues to self-secure the elongated instrument 120 so long at the bottom end 130 of the elongated instrument 120 remains within the retention type vessel of the bottom portion 115 of the retention apparatus 100. In this manner, the weight of the elongated instrument 120 allows the top end 125 of the elongated instrument 120 to remain self-secured by the top portion 105 of the retention apparatus 100.

Later, when the user wishes to remove the elongated instrument 120 from the retention apparatus 100 and return the retention apparatus 100 to the open position, this can easily be accomplished. For example, the user may simply grasp a surface of the elongated instrument 120 and lift the elongated instrument 120 in an upward direction. The applied user force in the upward direction on the elongated instrument 120 removed the weight of the elongated instrument 120 pressing downwards on the bottom portion 115 of the retention apparatus 100 allowing it to raise along with the upward lifting motion. This in turn releases the top end 125 of the elongated instrument 120 from the securing type of mechanism located at the top portion 105 of the retention apparatus 100. Thus, the elongated instrument 120 can be simply and efficiently removed from the retention apparatus 100 so that it may be employed for operational use by the end user.

Figure 2:
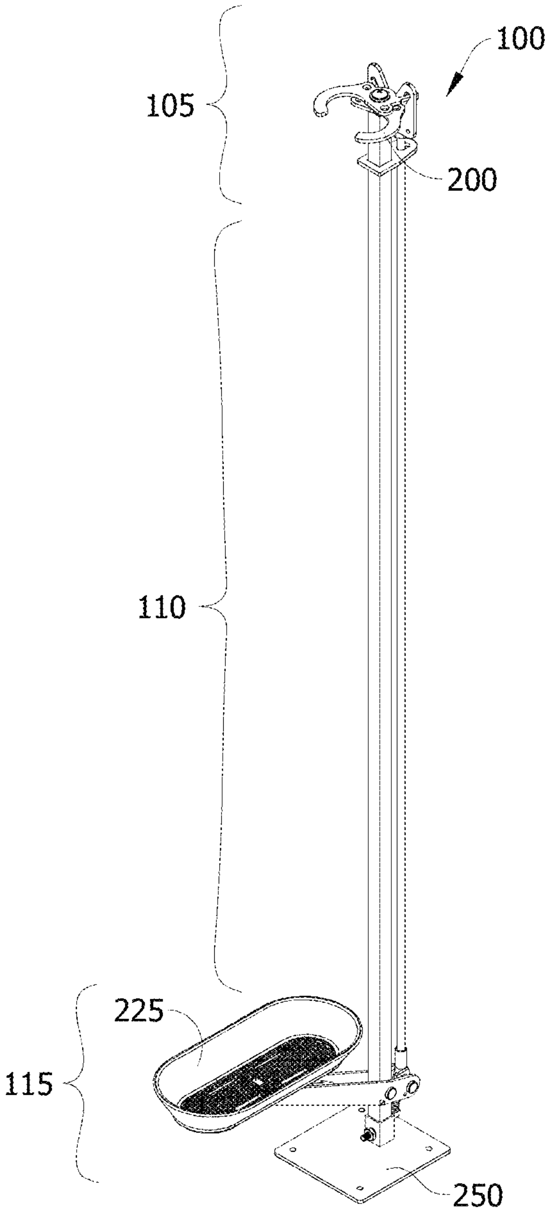
FIG. 2 illustrates an example retention apparatus in an open position in accordance with an embodiment of the disclosure.

In FIG. 2, the example retention apparatus 100 is illustrated in an open position. Here, the elongated instrument 120 has been removed from the retention apparatus 100 so that any other type or the same elongated instrument 120 can be later placed and secured by the retention apparatus 100. The retention apparatus 100, as discussed above, may have a plurality of portion like sections. A top portion 105 of the retention apparatus 100 may be present and viewed to be the greatest distance from the ground surface on which the retention apparatus 100 may be placed or may rest. The top portion 105 may contain a grasping mechanism 200. The grasping mechanism 200 is a component of the retention apparatus 100 that can secure a top end 125 of the elongated instrument 120 to the retention apparatus 100. The grasping mechanism 200 is envisioned to have multiple diverse types of configurations or possible designs. However, the grasping mechanism 200 should be able to operate with the other components of the retention apparatus 100 so that any desired elongated instrument 120 can be secured by the grasping mechanism 200. The grasping mechanism 200 can actuate between an open and closed position based on the retention apparatus 100 being in either its open position or securing position.

Below the top portion 105, a middle portion 110 of the retention apparatus 100 may be present. The middle portion 110 of the retention apparatus 100 extends vertically upwards from a bottom portion 115 of the retention apparatus 100 to the top portion 105 of the retention apparatus 100. The middle portion 110 may generally be of a greater longitudinal length than either the top portion 105 or the bottom portion 115. However, it should be understood that the middle portion 110 may be adjusted as appropriate to fit the size of a possible item to be secured by the retention apparatus 100.

Below the middle portion 110, the bottom portion 115 of the retention apparatus 100 may be present. The bottom portion 115 of the retention apparatus 100 may include a receptacle 225. The receptacle 225 may be configured to receive and contain the bottom end 130 of the elongated instrument 120 when the retention apparatus 100 is in the securing position. When the elongated instrument 120 is placed within the receptacle 225, the bottom portion 115 of the retention apparatus 100 may move downward due to the weight of the elongated instrument 120. This movement will allow the top portion 105 of the retention apparatus 100 via the grasping mechanism 200 the ability to secure and retain the top end 125 of the elongated instrument 120. Similarly, when the user wishes to remove the elongated instrument 120 from the retention apparatus 100, the receptacle 225 and the bottom portion 115 can move in an upward direction to facilitate release of the top end 125 of the elongated instrument 120 from the grasping mechanism 200.

At a lower end of the bottom portion 115 of the retention apparatus 100 a base 250 may be present. The base 250 may rest on a surface, such as but not limited to a ground surface. The base 250 may provide sufficient surface area contact with the surface so that the entire retention apparatus 100 can be positioned, and maintain a position, in a vertical orientation. In some embodiments, the base 250 can also be secured to the surface to further ensure a correct positioning and orientation of the retention apparatus 100. The upper end of the base plate may also couple to the middle portion 110 of the retention apparatus 100. In some embodiments, an opening of the base 250 may allow a component of the middle portion 110 to travel into and be secured by the base 250. Following FIGS. 3-13 will further illustrate and explain multiple components of each the top portion 105, middle portion 110, and bottom portion 115 of the envisioned retention apparatus 100.

Figure 3:
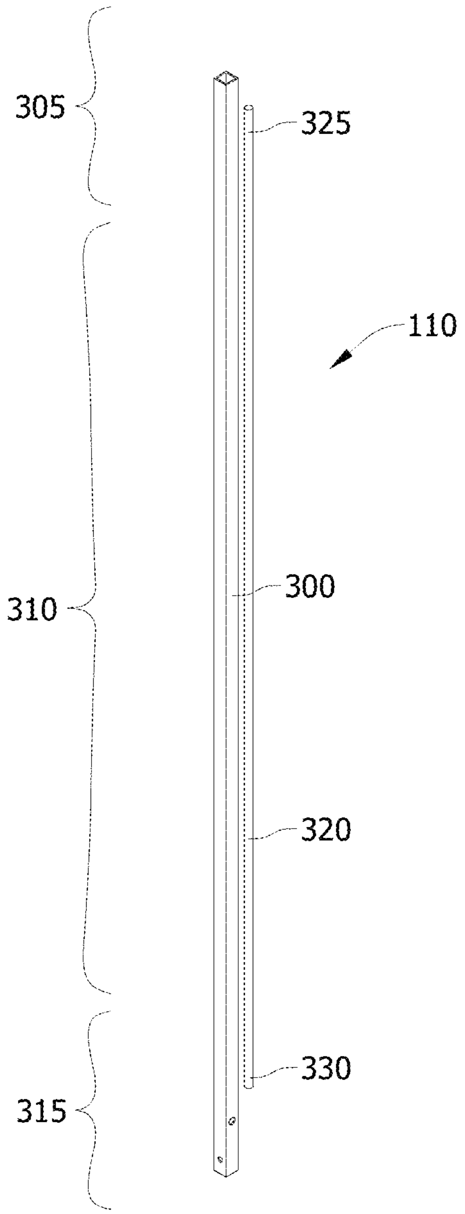
FIG. 3 illustrates components of a middle portion of the example retention apparatus in embodiment of the disclosure.

FIG. 3 shows components of the middle portion 110 of the retention apparatus 100. The components of the middle portion 110 are removed and separated from each the top portion 105 and the bottom portion 115 of the retention apparatus 100. In the middle portion 110, a shaft 300 may be present. The shaft 300 may be created with various metals or metallic alloys by way of custom cutting these metals or metallic alloys presented in a sheet form. Further, any cut metals or metallic alloys may then be folded appropriately with a metal fabrication tool or process to create the shaft 300. Alternatively, the shaft 300 may also be created by way of injection molding with the use of polymer or plastic type materials. In FIG. 3, for example, the shaft 300 is presented as a piece of prefabricated metallic structure such as but not limited metallic tubing. The shaft 300 may have a top shaft end 305 coupled to the top portion 105 of the retention apparatus 100, a bottom shaft end 315 coupled to the bottom portion 115 of the retention apparatus 100, and a middle portion 310 of the shaft 300 present between the top shaft end 305 and the bottom shaft end 315. The shaft 300, like the other components of the retention apparatus 100, may be coated with necessary protective layering which may consist of a second type of material not used to create the shaft 300. As the shaft 300 is to be employed generally in outdoor environments, any secondary coating material is to be protective and may assist in the longevity and protection of the shaft 300 against a range of thermal temperature distributions or other outdoor elements from damaging the shaft 300.

Also, as part of the middle portion 110 of the retention apparatus 100, a rod 320 may be present. The rod 320 may be the actuating or movable portion of the middle portion 110 of the retention apparatus 100. The rod 320 may assist and facilitate positional movement of the retention apparatus 100 between each the open position and the securing position. The rod 320 may be created with various metals or metallic alloys. The rod 320 may also be threaded or have fastening features to help assist coupling the rod 320 to different components of each the top portion 105 and the bottom portion 115 of the retention apparition 100. Alternatively, the rod 320 may also be created by way of injection molding with the use of polymer or plastic type materials. In FIG. 3, for example, the rod 320 is presented as a piece of solid metallic material having threading. The rod 320 may have a top rod end 325 coupled to components of the top portion 105 of the retention apparatus 100, and a bottom rod end 330 coupled to components of the bottom portion 115 of the retention apparatus 100. The rod 320, like the other components of the retention apparatus 100, may be coated with necessary protective layering which may consist of a second type of material not used to create the rod 320. As the rod 320 is to be employed generally in outdoor environments, any secondary coating material is to be protective and may assist in the longevity and protection of the rod 320 against a range of thermal temperature distributions or other outdoor elements from damaging the rod 320.

Figure 4:
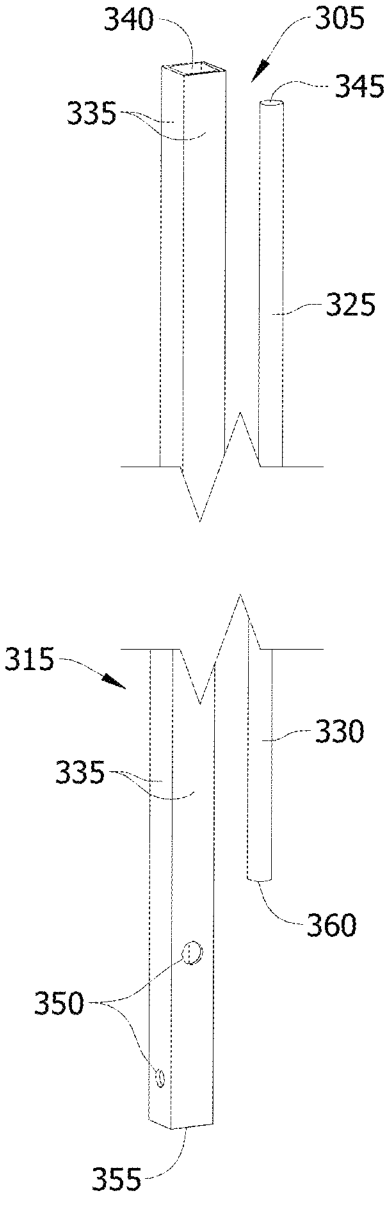
FIG. 4 illustrates an enhanced view of a top end section and a bottom end section of components of the middle portion of the example retention apparatus in embodiment of the disclosure.

FIG. 4 illustrates an enhanced view of the top shaft end 305 and the bottom shaft end 315 removed from the middle portion 310 of the shaft 300. The shaft 300 may have a plurality of shaft sides 335. The shaft 300, viewed in FIGS. 3 and 4, is shown to be a square type of configuration, but it should be understood that other configurations such as cylindrical, triangular, pentagonal, hexagonal, octagonal, or like are possible. Each shaft side 335 may travel the length of the shaft 300 from the top shaft end 305 and the bottom shaft end 315. At the top shaft end 305, a top shaft opening 340 may be present. The plurality of shaft sides 335 may create a hollow interior area that travels the length of the shaft 300. The top shaft opening 340 may provide access to this hollow interior area of the shaft 300 and allow for a space into which components of the top portion 105 of the retention apparatus 100 can be secured to the shaft.

At the bottom shaft end 315, a bottom shaft opening 355 may be present. The plurality of shaft sides 335 creating the hollow interior area that travels the length of the shaft 300 may terminate at this bottom shaft opening 355. The bottom shaft opening 355 may provide access to this hollow interior area of the shaft 300 and allow for a space into which components of the bottom portion 115 of the retention apparatus 100 can be secured to the shaft. Alternatively, the plurality of shaft sides 335 near the bottom shaft opening 355 may fit into and couple to the base 250 in some embodiments. Further, the bottom shaft end 315 may have a plurality of bottom shaft openings 350 present on select shaft sides. The plurality of bottom shaft openings 350 may be present on one of the shaft sides 335 and may also have a corresponding opening on the opposite shaft side 335. In this manner, a fastening mechanism, such as a pin or tab, may be positioned and placed through the plurality of bottom shaft openings 350 to secure the shaft 300 to a base 250 or to secure the shaft 300 to other components of the bottom portion 115 of the retention apparatus 100.

In FIG. 4, the rod 320 with its top rod end 325 and its bottom rod end 330 are viewed with respect to the positional location of associated shaft 300 components and areas. The top rod end 325 of rod 320 may have a top rod surface 345. The top rod surface 345 may be flat to allow for easier coupling to components of the top portion 105 of the retention apparatus 100. Further, the bottom rod end 330 of rod 320 may have a bottom rod surface 360. The bottom rod surface 360, like the top rod surface 345, may be flat to allow for easier coupling to components of the bottom portion 115 of the retention apparatus 100.

Figure 5:
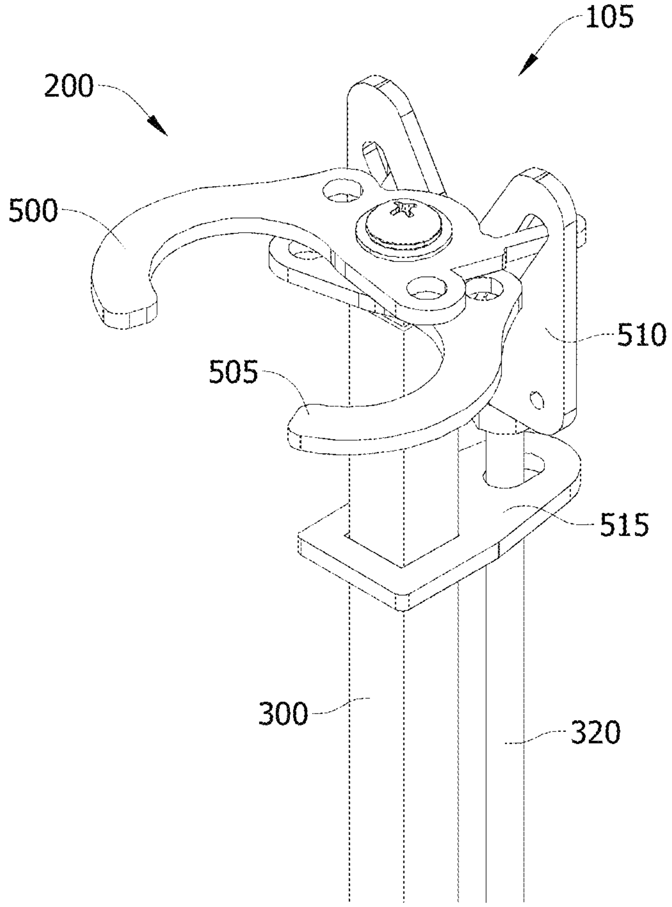
FIG. 5 illustrates components of a top portion of the example retention apparatus in embodiment of the disclosure.

FIG. 5 shows components of the top portion 105 of the retention apparatus 100. The components of the top portion 105 are shown coupled to components of the middle portion 110 of the retention apparatus 100 when the retention apparatus 100 is in a completed assembled orientation. As stated above, the top portion 105 of the retention apparatus 100 may have a grasping mechanism 200. The grasping mechanism 200 can secure a top end 125 of the elongated instrument 120 to the retention apparatus 100. The grasping mechanism 200 is envisioned to have multiple diverse types of configurations or possible designs. The grasping mechanism 200 can actuate between an open and closed position based on the retention apparatus 100 being in either its open position or securing position. The grasping mechanism 200 viewed in FIG. 5 may have a plurality of clasps 500 and 505. In other envisioned embodiments a single clasp may be used as the grasping mechanism 200. The grasping mechanism 200 of FIG. 5 may have a first clasp 500 and a second clasp 505. Each the grasping mechanism 200, the first clasp 500, and the second clasp 505 are viewed in the open position. It should be understood that during operation, the first clasp 500 and the second clasp 505 may move toward one another in a horizontal movement to close and create an interior confinement space when the first clasp 500 and the second clasp 505 are in the closed position. In the closed position, the grasping mechanism 200 via the first clasp 500 and the second clasp 505 can secure the top end 125 of the elongated instrument 120 within the created confinement space. The grasping mechanism 200 may also be coupled to the shaft 300 at the top shaft end 305.

To facilitate movement of the grasping mechanism 200 between the open and closed position, a back plate 510 is used and is part of the top portion 105 of the retention apparatus 100. The back plate 510 can transition linear movement of the retention apparatus 100 into rotational movement of the grasping mechanism 200 due to the features present on the back plate 510. The back plate 510 may be coupled to the rod 320 to receive any associated linear movement of the retention apparatus 100. Further, component pieces of the grasping mechanism 200 may be secured with the back plate 510. For example, and viewed in FIG. 5, the first clasp 500 may be positionally secured through the back plate 510 in one location and the second clasp 505 may be positionally secured through the back plate 510 in another location.

Below each the back plate 510 and the grasping mechanism 220, a guide 515 may be present. The guide 515 may have openings through which each the shaft 300 and rod 320 can travel. The guide 515 allows for the rod 320 to remain an appropriate distance from the shaft 300. The guide 515 also allows for the rod 320 to remain in the correct positional orientation so that operation of the retention apparatus 100 between the open and securing position is possible and not hindered by any incorrect positioning of the rod 320. In some embodiments, the guide 515 can be affixed or fastenable secured to the shaft 300 so it cannot move from a specific location.

Figure 6:
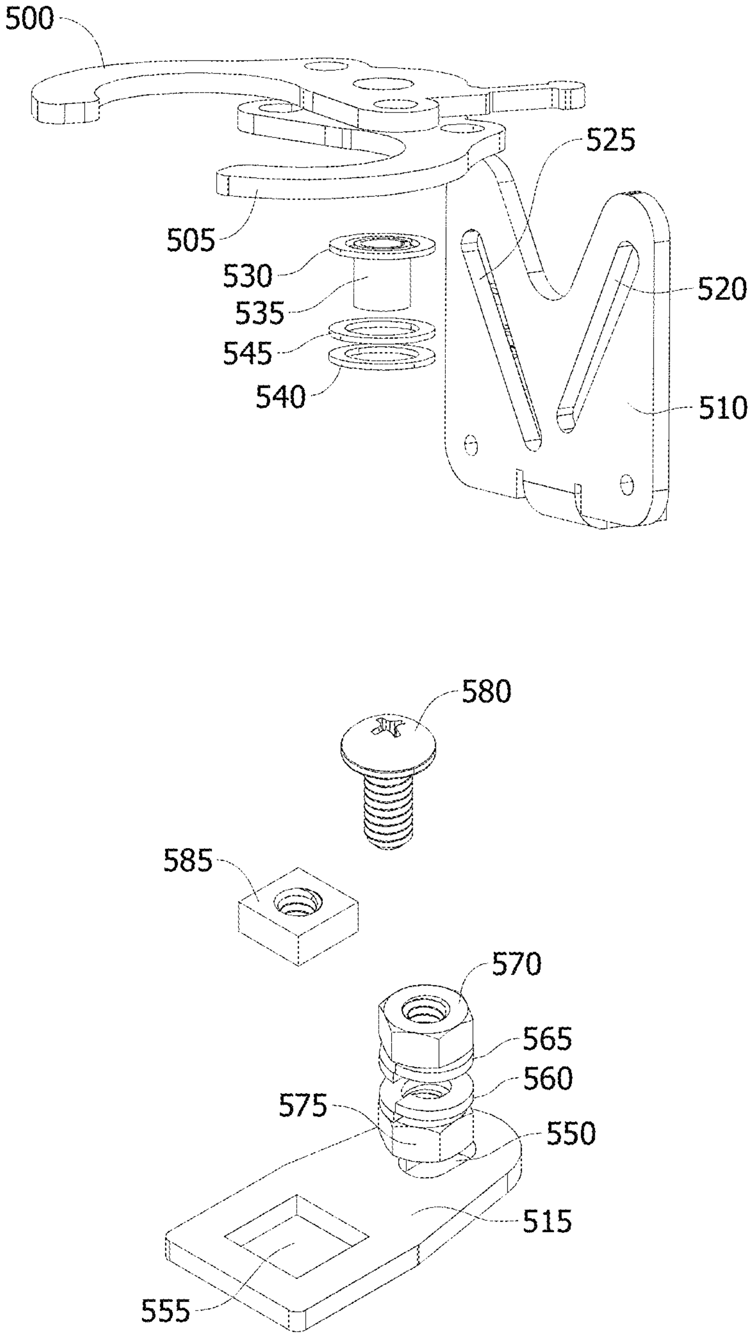
FIG. 6 shows an exploded view of the top portion components of the example retention apparatus in embodiment of the disclosure.

FIG. 6 shows an exploded view of the multiple components that may be present and part of the top portion 105 of the retention apparatus 100. As discussed above, the grasping mechanism may include a first clasp 500 and a second clasp 505. The first clasp 500 and the second clasp 505 may have a flat planar top surface and bottom surface. FIG. 6 illustrates that first clasp 500 located above and generally resting on the second clasp 505. In assembly of the grasping mechanism 220, a grasping fastener 580, such as a screw, bolt, pin, or the like may be used to secure all the components of the grasping mechanism 200 together for placement within the top shaft opening 340 of shaft 300. A plurality of spacers 530, 540, and 545 may be present and used as part of the grasping mechanism 200. A first spacer 530 may be positional located between the grasping fastener 580 and the first clasp 500. The first spacer 530 may aid in protecting the first clasp 500 from damage possible from the grasping fastener 580 and allow for easier movement of the first clasp 500 and the second clasp 505 as they move from the open to the closed position. A second spacer 545 may be positionally located between the first clasp 500 and the second clasp 505 to provide a minor spatial offset and allow for easier movement of the first clasp 500 and the second clasp 505 as they move from the open to the closed position. The third spacer 540 may be positional located between the second clasp 505 and a grasping nut 585. The first spacer 530 may aid in protecting the second clasp 505 from damage possible from the grasping nut 585 and allow for easier movement of the first clasp 500 and the second clasp 505 as they move from the open to the closed position. The grasping nut 585 can be tightened onto the grasping fastener 580 to secure components of the grasping mechanism 200 together. Further, the grasping nut 585 may be formed to be a slightly smaller dimension than the shaft 300. In this manner, the grasping nut 585 can fit into and create a snug fit within the hollow interior of the shaft 300 when the grasping mechanism is placed in the assembled configuration of the retention apparatus 100. Further any rotational movement by the grasping mechanism 200 while within the hollow interior of the shaft 300 can be blocked or prevented by the grasping nut 585 contacting the shaft 300. Finally, a grasping guide 535 may be present. The components of the grasping mechanism may fit over and surround the grasping guide 535. The grasping guide 535 provides a pathway for the grasping fastener 580 to travel without contacting the other components of the grasping mechanism 200 to mate and be secured by the grasping nut 585.

The back plate 510 is also viewed in FIG. 6. The back plate 510 may have a first back plate channel 520 and a second back plate channel 525. A portion of the first clasp 500 may fit through the first back plate channel 520 and then be secured within the first back plate channel 520. Also, a portion of the second clasp 505 may fit through the second back plate channel 525 and then be secured within the second back plate channel 525. The back plate 510 can then be secured to the rod 320 by a plurality of back plate fasteners 560, 565, 570, and 570. The back plate 510 may have an opening through which rod 320 may travel. As rod 320 may be threaded, a first rod nut 570 and a second rod nut 575 may be positioned on the rod and manipulated to lock a positional orientation of the rod onto the back plate 510 when the rod 320 is located through the portion of the back plate 510 with the opening. A first rod washer 565 may be located between the first rod nut 570 and the portion of the back plate 510 with the opening. The first rod nut 570 may be tightened to contact the first rod washer 565 and secure the position of the back plate 510. Also, a second rod washer 560 may be located between the second rod nut 575 and the portion of the back plate 510 with the opening. The second rod nut 575 may be tightened to contact the second rod washer 560 and secure the position of the back plate 510. Tightening of each the first rod nut 570 and the second rod nut 575 locks the positional orientation of the rod 320 within the opening of the back plate 510.

The guide 515 is also viewed in FIG. 6. As stated above, the guide 515 allows for the rod 320 to be appropriately positioned at a set dimensional distance from the shaft 300 to ensure proper operation of retention apparatus 100. The guide 515 may have a shaft opening 555. The shaft opening 555 may be configured to the shape of the shaft 300 which will fit into the shaft opening 555 and may allow for the guide 515 to move as desired along the shaft 300. The guide 515 may also have a rod opening 550. The rod opening 550 may be configured to the shape of the rod 320 which will fit into the rod opening 550 and may allow for the guide 515 to move as desired along the rod 320. In some embodiments, the guide may be affixed to the shaft 300, or be created as part of the shaft 300 from a single piece of common material.

Figure 7:
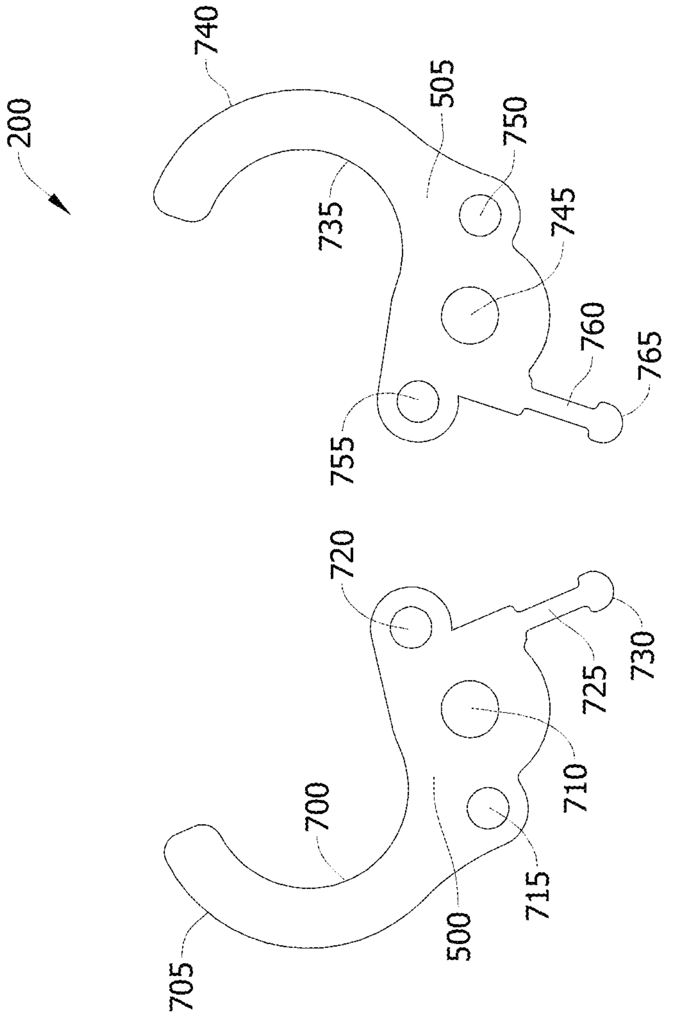
FIG. 7 illustrates components of a retention mechanism of the example retention apparatus in embodiment of the disclosure.

Turning now to FIG. 7, the first clasp 500 and the second clasp 505 of the grasping mechanism 200 are viewed. As viewed in FIG. 7, the first clasp 500 and the second clasp 505 may be mirror-like images of one another in some embodiments. Thus, the same component part may be used for both the first clasp 500 and the second clasp 505 in some embodiments. The first clasp 500 may be made of any type of metallic, polymer, plastic, rubber, malleable material, or the like. It is envisioned that the selected material for the first clasp 500 be a material that is both durable and resistant or safe for use with various types of materials that may be present with the elongated instrument 120 so that the elongated instrument 120 is not damaged by the first clasp 500. The first clasp 500 may have a first clasp arm 705 which extends outward from a general center of the first clasp 500 and then curves inward. The first clasp arm 705 creates an interior first clasp surface 700 that may be semicircular in design, but it should be understood that other types of orientations are possible. The first clasp surface 700 may be the area of the first clasp 500 that contacts the secured portion of the elongated instrument 120 in operational use of the retention apparatus 100. The first clasp 500 may also have a connector opening 710. The connector opening 710 may be positioned so that in the assembled position it is in common alignment with another connector opening of the second clasp 505. Further, the connector opening 710 is an area through which the grasping fastener 580 may travel through. The first clasp 500 may also have a plurality of locking openings 715 and 720. Depending on the position of the first clasp 500, either the first locking opening 715 or the second locking opening 720 may be aligned with another locking opening of the second clasp 505 when the retention apparatus 100 is in the securing position. This alignment allows for a secondary locking function, such as a pin or bolt, to be placed through either the first or second locking opening 715 or 720 to add an additional locking operation to the retention apparatus 100.

The first clasp 500 also may have a back plate extension 725. The back plate extension 725 travels outward and away from the first clasp 500 and is positionally present within the appropriate channel of the back plate 510. To secure the first clasp 500 to the back plate 510 and the appropriate channel present on the back plate, a locking tab 730 may be present at the end of the back plate extension 725. While the first clasp 500 is to have a common height throughout the first clasp 500, the locking tab has a greater width than the back plate extension 725. To assemble the first clasp 500 to the back plate 510, the first clasp 500 can be rotated so that the height dimension of the first clasp 500 can pass through the appropriate channel present on the back plate 510. Then within this position, the first clasp 500 can be rotated to the correct horizontal position for operation. In the horizontal position of the first clasp 500, the locking tab 730 has a larger width than the appropriate channel on the back plate 510 through which it is now located. Thus, the first clasp 500 cannot be removed from the back plate 510 when the retention apparatus 100 is fully assembled.

Also viewed in FIG. 7 is the second clasp 505. The second clasp 505 may be made of any type of metallic, polymer, plastic, rubber, malleable material, or the like. It is envisioned that the selected material for the second clasp 505 be a material that is both durable and resistant or safe for use with various types of materials that may be present with the elongated instrument 120 so that the elongated instrument 120 is not damaged by the first clasp 500. The second clasp 505 may have a second clasp arm 740 which extends outward from a general center of the second clasp 505 and then curves inward. The second clasp arm 740 creates an interior second clasp surface 735 that may be semicircular in design, but it should be understood that other types of orientations are possible. The second clasp surface 735 may be the area of the second clasp 505 that contacts the secured portion of the elongated instrument 120 in operational use of the retention apparatus 100. The second clasp 505 may also have a connector opening 745. The connector opening 745 may be positioned so that in the assembled position it is in common alignment with another connector opening of the first clasp 500. Further, the connector opening 745 is an area through which the grasping fastener 580 may travel through. The second clasp 505 may also have a plurality of locking openings 750 and 755. Depending on the position of the second clasp 505, either the first locking opening 750 or the second locking opening 755 may be aligned with another locking opening of the first clasp 500 when the retention apparatus 100 is in the securing position. This alignment allows for a secondary locking function, such as a pin or bolt, to be placed through either the first or second locking opening 750 or 755 to add an additional locking operation to the retention apparatus 100.

The second clasp 505 also may have a back plate extension 760. The back plate extension 760 travels outward and away from the second clasp 505 and is positionally present within the appropriate channel of the back plate 510. To secure the second clasp 505 to the back plate 510 and the appropriate channel present on the back plate 510, a locking tab 765 may be present at the end of the back plate extension 760. While the second clasp 505 is to have a common height throughout the second clasp 505, the locking tab 765 has a greater width than the back plate extension 760. To assemble the second clasp 505 to the back plate 510, the second clasp 505 can be rotated so that the height dimension of the second clasp 505 can pass through the appropriate channel present on the back plate 510. Then within this position, the second clasp 505 can be rotated to the correct horizontal position for operation. In the horizontal position of the second clasp 505, the locking tab 765 has a larger width than the appropriate channel on the back plate 510 through which it is now located. Thus, the second clasp 505 cannot be removed from the back plate 510 when the retention apparatus 100 is fully assembled.

Figure 8C:
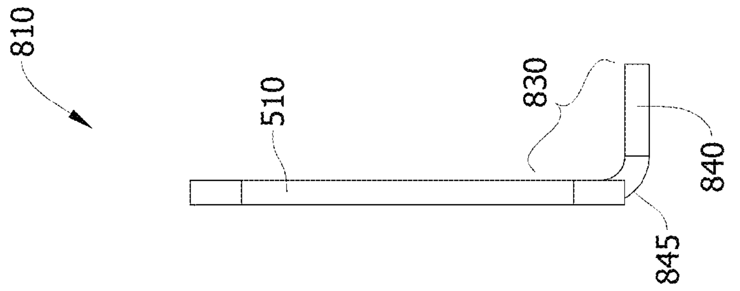
FIG. 8C shows a side view of the back plate of the example retention apparatus in embodiment of the disclosure.
Figure 8B:
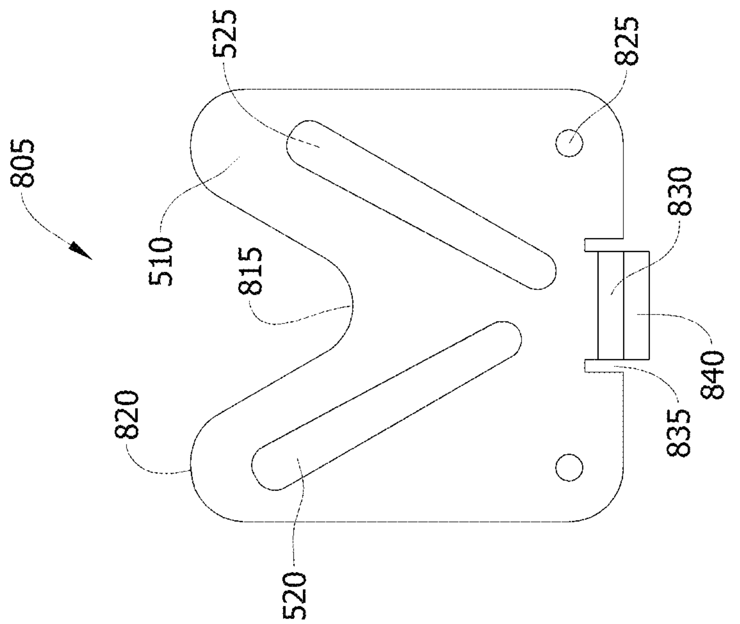
FIG. 8B shows a back view of the back plate of the example retention apparatus in embodiment of the disclosure.
Figure 8A:
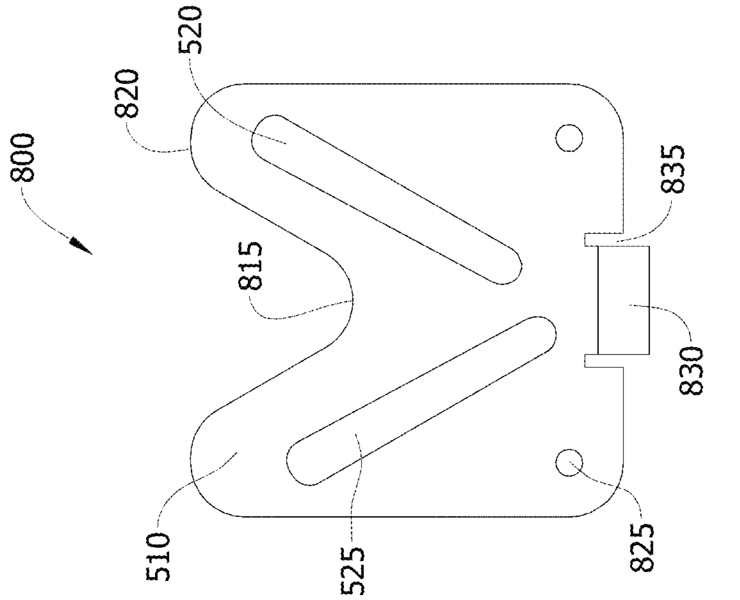
FIG. 8A shows a front view of a back plate of the example retention apparatus in embodiment of the disclosure.

FIGS. 8A, 8B, and 8C illustrate different views of the back plate 510 of the retention apparatus 100. In FIG. 8A, a back plate front view 800 is illustrated. The back plate 510 can transition linear movement of the retention apparatus 100 into rotational movement of the grasping mechanism 200 due to the features present on the back plate 510. The back plate 510 may have a first back plate channel 520 and a second back plate channel 525. It should be noted that each the first back plate channel 520 and a second back plate channel 525 are not positionally symmetrical on the back plate 510. As viewed in the figures, first back plate channel 520 is located positionally higher on the back plate 510 than the second back plate channel 525. Each the first back plate channel 520 and a second back plate channel 525 may have the same length, and thus the first back plate channel 520 terminates positionally higher on the back plate 510 than the second back plate channel 525. The locational difference of the first back plate channel 520 and a second back plate channel 525 are based on the positional location of each the first clasp 500 and the second clasp 505. To accommodate this locational difference of the clasps, adjustments are presented as well within the back plate 510 for the first back plate channel 520 and a second back plate channel 525.

The back plate 510 may also have an apex peak 820 that may be common to each side of the back plate 510. The apex peak 820 provides additional surface area to the back plate 510 to accommodate the locations of each the first back plate channel 520 and the second back plate channel 525. Between the apex peak 820 and valley point 815 may be present. The valley point allows for the user a location to grasp the upper end of the retention mechanism 100 and allows for easier access for assembly and disassembly of the grasping mechanism 200 as needed.

At the bottom of the back plate 510, a back plate extension 830 may be present. The back plate extension travels backward from the rear of the back plate 510. An opening may be present in the back plate extension 830 where the rod 320 can attach or be affixed to the back plate 510. Flanking the back plate extension may be back plate slits 835. The back plate slits 835 may provide a location where additional components can mate with the back plate 510 if needed. However, the back plate slits also provide the back plate 510 with flexibility. As operational forces of the retention apparatus 100 are employed during use, forces exerted on the rod 320 will be transferred to the back plate extension 830. The back plate slits 835 provide the back plate extension 830 flexibility and allow for distribution of these forces to the entirety of the back plate 510 when movements are needed of the entire back plate 510 so that the back plate extension 830 does not snap or break off if formed as a piece of a common back plate 510 material. The back plate 510 may have a plurality of openings 825. These openings may be used to attach additional components or secure the back plate 510 in other means.

In FIG. 8B a back plate rear view 805 is illustrated. Many of the same elements and features of the back plate 510 discussed above in FIG. 8A are also presented in FIG. 8B. Once again, the back plate extension 830 is viewed. The back plate extension 830 may include a horizontal protrusion 840. The horizontal protrusion 840 may have flat planar upper and lower surfaces. The opening through which the rod 320 can attach to the back plate extension 830 may be present and travel through the horizontal protrusion 840.

In FIG. 8C a back plate side view 810 is illustrated. Many of the same elements and features of the back plate 510 discussed above in FIG. 8A and FIG. 8B are also presented in FIG. 8C. Once again, the back plate extension 830 is viewed. The back plate extension 830 may include a horizontal protrusion 840. The flat planar upper and lower surfaces of the horizontal protrusion 840 are easily viewable in FIG. 8C. Further, the back plate extension 830 with the horizontal protrusion 840 can be viewed to be approximately at a ninety-degree angle with the overall position of the backplate 510. However, the angle created by the back plate extension 830 with the horizontal protrusion 840 is not abrupt. The back plate extension 830 may have a curved segment 845 that gradually changes the orientation of the back plate extension 830 into the horizontal protrusion 840. This curved segment 845 helps provide the overall back plate 510 with flexibility. As operational forces of the retention apparatus 100 are employed during use, forces exerted on the rod 320 will be transferred to the back plate extension 830 and mainly the horizontal protrusion 840. This curved segment 845 provides the back plate extension 830 flexibility and allow for distribution of these forces to the entirety of the back plate 510 when movements are needed of the entire back plate 510 so that the back plate extension 830 does not snap or break off where the back plate extension 830 turns into the horizontal protrusion 840. An abrupt transition to the horizontal protrusion 840 would be a noted point of failure especially if a combination of components is affixed together to form the back plate extension 830 with the horizontal protrusion 840. Thus, the existence of the curved segment 845 helps alleviate possible failure at this point during operation of the retention apparatus 100.

Figure 9B:
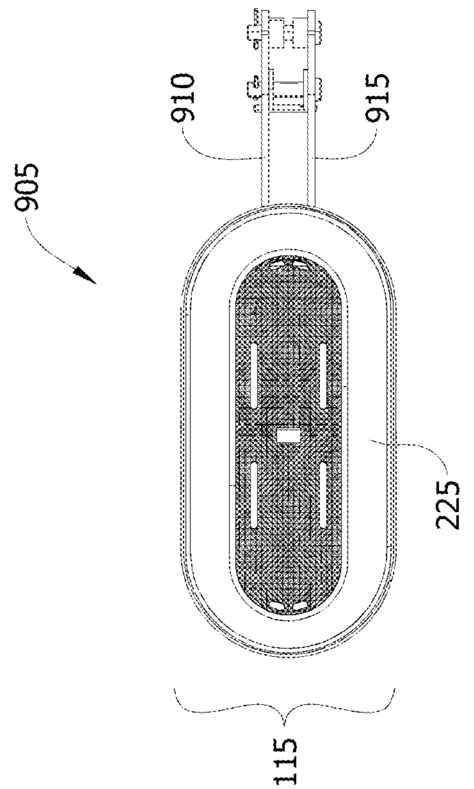
FIG. 9B illustrates a top side view of components of the bottom portion of the example retention apparatus in embodiment of the disclosure.
Figure 9A:
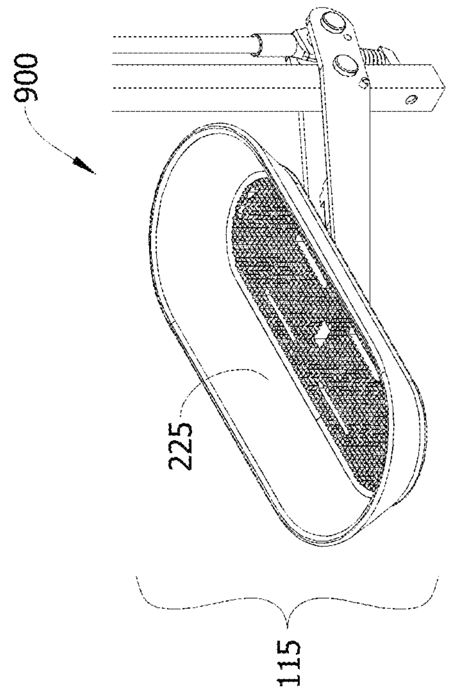
FIG. 9A illustrates a perspective view of components of a bottom portion of the example retention apparatus in embodiment of the disclosure.

FIG. 9A shows components of the bottom portion 115 of the retention apparatus 100 as a bottom portion perspective view 900. The components of the bottom portion 115 are shown coupled to components of the middle portion 110 of the retention apparatus 100 when the retention apparatus 100 is in a completed assembled orientation. Components of the bottom portion 115 related to the base 250 are not viewed in FIG. 9A. As stated earlier, the bottom portion 115 may contain a receptacle 225 that is in operative communication with the middle portion 110 and the top portion 105 of the retention apparatus 100. Thus, movement of the receptacle 225 may facilitate movement of the rod 320 when the bottom portion 115 is connected by way of a pivot point with the shaft 300.

FIG. 9B shows components of the bottom portion 115 of the retention apparatus 100 as a top-down bottom portion view 905. Here, components of the bottom portion 115 are shown with some of the fastening components used to couple the bottom portion 115 to the middle portion 110 of the retention apparatus 100, but without components of the middle portion 110 viewed. The bottom portion 115 may contain a receptacle 225 that is in operative communication with the middle portion 110. The receptacle 225 may be coupled to the middle portion 110 components by a plurality of arms. A first arm 910 may connect the receptacle 225 to a first outside surface of the shaft 300 and connectors associated with the rod 320. A second arm 915 may connect the receptacle 225 to a second outside surface of the shaft 300 and connectors associated with the rod 320.

Figure 10:
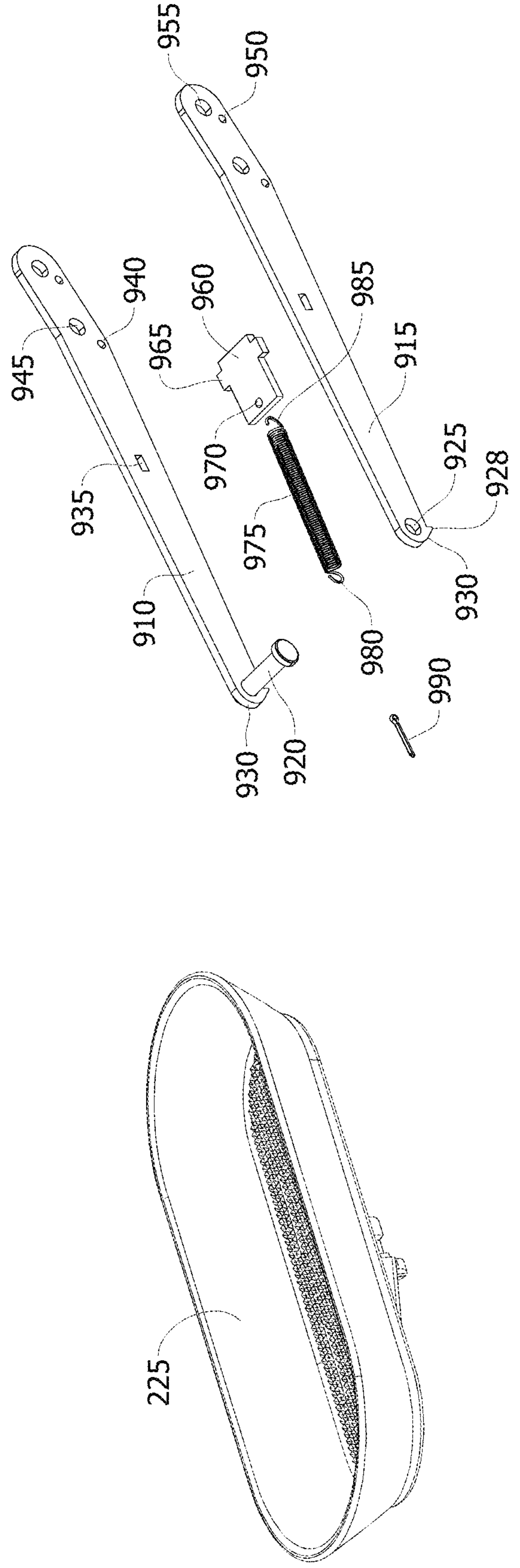
FIG. 10 shows an exploded view of the bottom portion components of the example retention apparatus in embodiment of the disclosure.

FIG. 10 shows an exploded view of the multiple components that may be present and part of the bottom portion 115 of the retention apparatus 100. The receptacle 225 is viewed in FIG. 10 but will be described in greater detail within FIGS. 11A, 11B, and 11C. Also viewed in FIG. 10 with additional detail are the first arm 910 and the second arm 915. The first arm 910 and the second arm 915 may generally mirror one another in size and shape with a few differences. Each arm may have a first end and a second end. The first end of each the first arm 910 and the second arm 915 may be a greater dimensional distance than the second end. The first end of each the first arm 910 and the second arm 915 may be on a same axis, while the second end of the first arm 910 and the second arm 915 may be on a different axis. An angle between the first axis of the first ends and the second axis of the second ends may be an obtuse angle less than one hundred and eighty degrees but greater than ninety degrees to help facilitate movement of the arms and the overall bottom portion 115 of the retention apparatus 100 with the middle portion 110 in operational use.

The first end of the first arm 910 and the second arm 915 may couple to the receptacle 225. Each the first arm 910 and the second arm 915 may have a receptacle opening 925. A receptacle connector 920 may travel through each respective receptacle openings 925 and the receptacle 225 to create this connection between the receptacle 225 and the first arm 910 and the second arm 915. The receptacle connector 920 may then be further secured in this location by a receptacle lock 990 to keep the receptacle connector 920 in the correction position and connected orientation. Further, each the first arm 910 and the second arm 915 may have an arm block 930. The arm block 930 may extend and protrude outward from each the first arm 910 and the second arm 915 near the termination of the first end of each the first arm 910 and the second arm 915. The arm block 930 helps maintain the receptacle 225 in a desired positional orientation during operation of the retention apparatus 225. For example, in the first receptacle position or an open position of the retention apparatus 100, the arm block 930 may contact a lower component feature of the receptacle 225 to keep the receptacle 225 in a level and horizontal position so that the elongated instrument 120 can be placed within the receptacle 225. Further, the arm block 930 on each the first arm 910 and the second arm 915 can have a lower downward facing hook extension 928. The hook extension 928 provides additional surface area for each the first arm 910 and the second arm 915 where the hook extension 928 may also contact the lower component feature of the receptacle 225 to keep the receptacle 225 in a level and horizontal position for operational use of the retention apparatus 100.

At the second end of the first arm 910 and the second arm 915, additional connective openings and features may be present. Near the termination end of the second end of each the first arm 910 and the second arm 915, a rod opening 955 may be present on each arm. The rod opening 955 may fit a connection mechanism to couple the first arm 910 and the second arm 915 to the rod 320 so that movement of the first arm 910 and the second arm 915 can transfer movement forces to the rod 320. Near the rod opening 955, a force mechanism opening 950 may be present. The force mechanism opening 950 may allow for a force mechanism to be attached to the first arm 910 or the second arm 915 by way of the force mechanism opening 950. Further, in the middle of each arm of the first arm 910 and the second arm 915 an arm connector opening 935 may be present. The arm connector opening 935 may be a slot or slit into which an arm connector 960 can fit to couple the first arm 910 to the second arm 915 in assembly of the retention apparatus 100.

Additionally, near the meeting point of the first end and the second end of each the first arm 910 and the second arm 915, a shaft opening 945 may be present to allow each the first arm 910 and the second arm 915 to couple to the shaft 300. Each the first arm 910 and the second arm 915 may have a shaft opening 945. The shaft opening 945 may fit a connection mechanism to couple the first arm 910 and the second arm 915 to the shaft 300 so that movement of the first arm 910 and the second arm 915 can transfer movement forces to the rod 320.

The arm connector 960 is also viewed in FIG. 10. The arm connector 960 secures a connection between the first arm 910 and the second arm 915. The arm connector 960 may have a plurality of arm connector tabs 965 on opposite ends of the arm connector 960. The arm connector tabs 965 may be created as protrusions outwardly extending from the arm connector 960 in the same manner and shape as the arm connector openings 935 so that arm connector tabs 965 can easily fit into and be secured by the arm connector openings 935 to connect the first arm 910 and the second arm 915. Further, the arm connector 960 may have a receptacle force mechanism opening 970. The receptacle force mechanism opening 970 may be an open location traveling through the arm connector 960 so that an appropriate force mechanism can be attached and secured to the arm connector 960 by way of the receptacle force mechanism opening 970.

In FIG. 10, a receptacle force mechanism 975 is viewed. The receptacle force mechanism 975 may be a type of fastener or component able to apply a force to each the receptacle 225 and other components of the bottom portion 115 of the retention apparatus 100 to adjust possible positioning and orientation of the receptacle 225 during operation of the retention apparatus 100. The receptacle force mechanism 975 viewed in FIG. 10 is a receptacle spring, and a helical spring, but it should be understood that other possible force mechanisms or types of springs may be used as the receptacle force mechanism 975. A first receptacle force mechanism end 985 may be secured to the bottom portion 115 of the retention apparatus 100. For example, the first receptacle force mechanism end 985 can be a hook of the helical spring that is secured to the receptacle force mechanism opening 970 located on the arm connector 960. Also, the receptacle force mechanism 975 may have a second receptacle force mechanism end 980. The second receptacle force mechanism end 980 may be receptacle 225. In this manner and fashion, both tensile and compressive forces may be applied to each the receptacle 225 and the bottom portion 115, via the arm connector 960, by the receptacle force mechanism 975 during operation of the retention apparatus 100.

Figures 11A, 11B, 11C:
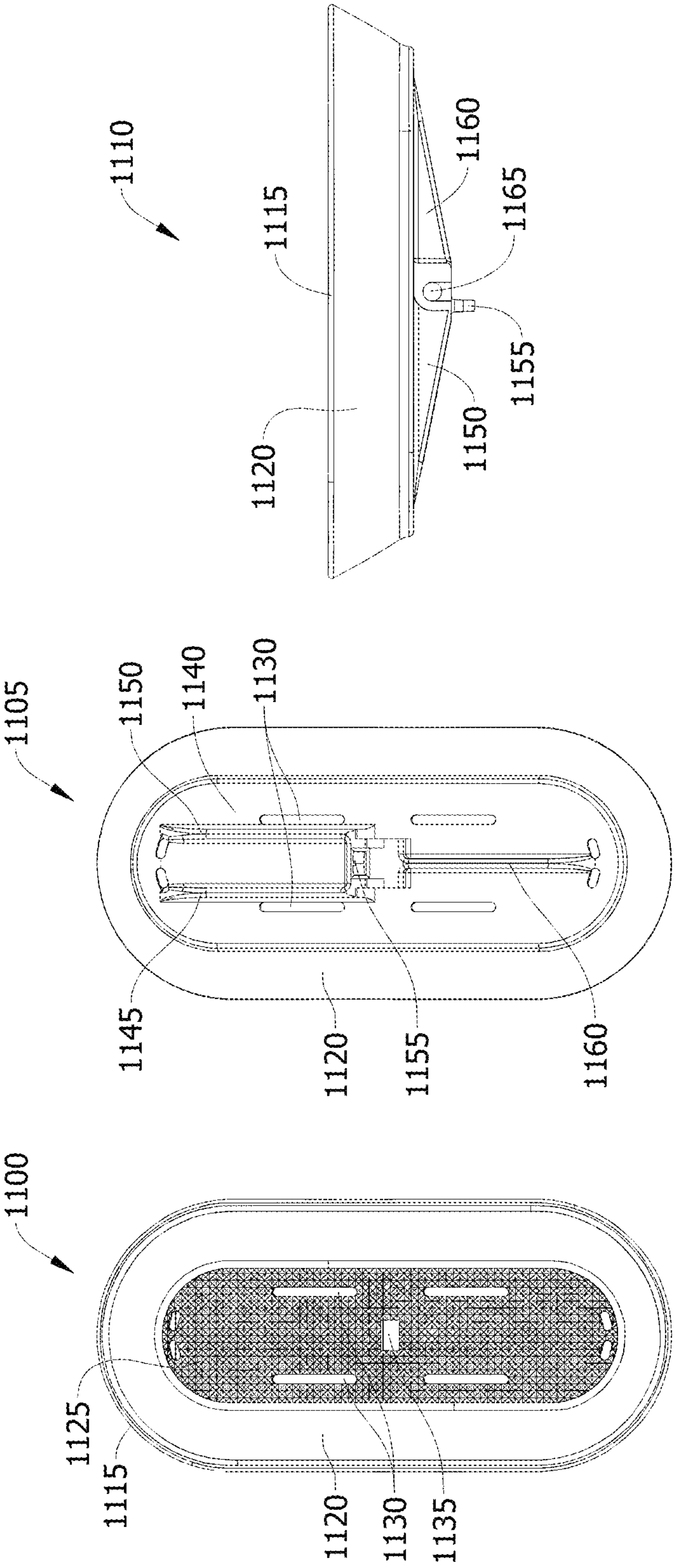
FIG. 11A shows a top side view of a receptacle of the example retention apparatus in embodiment of the disclosure.
FIG. 11B shows a bottom side view of the receptacle of the example retention apparatus in embodiment of the disclosure.
FIG. 11C shows a side view of the receptacle of the example retention apparatus in embodiment of the disclosure.

FIGS. 11A, 11B, and 11C illustrate different views of the receptacle 225 of the retention apparatus 100. In FIG. 11A, a receptacle top view 1100 is illustrated. The receptacle 225 may have a top rim 1115 that circumnavigates and creates the general shape of the receptacle 225. The receptacle 225 viewed in FIGS. 11A, 11B, and 11C is generally oval, but other possible configurations and shape designs are possible and envisioned. The receptacle 225 may also have a receptacle side wall 1120 that circumnavigates the receptacle 225. The receptacle side wall 1120 travels upward and angles outward from a receptacle surface 1125 to the top rim 1115. In this manner, the perimeter edge of the top rim 1115 is of a larger dimension than any perimeter edge of the receptacle surface 1125. The receptacle surface 1125 may generally be planar. However, the receptacle surface 1125 may also be textures with a plurality of ridges and a plurality of valleys located on the receptacle surface 1125. This texture of ridges and valleys helps to secure and maintain an appropriate contact position of the elongated instrument 120 within the receptacle 225. The receptacle 225 may also have a center point 1135. The center point 1135 may be a depression into and below the receptacle surface 1125 in some embodiments. The center point 1135 may generally be the location where the receptacle 225 can connect with the receptacle force mechanism 975 on the bottom side of the receptacle 225. Further, the receptacle 225 may have a plurality of receptacle openings 1130 that travel through the receptacle surface 1125. This plurality of receptacle openings 1130 allow for the removal of liquids or other debris from the receptacle surface 1125 during operational use of the retention apparatus 100.

In FIG. 11B, a receptacle bottom view 1105 is illustrated. The receptacle 225 may have a receptacle bottom surface 1140. The receptacle bottom surface 1140 may correspond to the receptacle surface 1125 viewed in FIG. 11A. Also viewed in FIG. 11B is top rim 1115 that circumnavigates and creates the general shape of the receptacle 225, and the receptacle side wall 1120 travels upward and angles outward from a receptacle bottom surface to the top rim 1115. The plurality of receptacle openings 1130 can also be viewed in FIG. 11B traveling through and providing passage through the receptacle surface 1125 and the receptacle bottom surface 1140.

Also present in FIG. 11B are a plurality of blocking extensions 1145 and 1150 on the receptacle bottom surface 1140. Each blocking extension 1145 and 1150 may travel outward from the center point 1135 toward a first end of the receptacle 225. The blocking extensions 1145 and 1150 may each extend outward from the receptacle bottom surface 1140 and be formed as part of the overall receptacle 225. Further, each blocking extension 1145 and 1150 may travel outward a larger distance near the center point 1135 while gradually decreasing in outward distance as they near termination at the first end of the receptacle 225. In operation, the blocking extensions 1145 and 1150 are to be positioned near each the first arm 910 and the second arm 915 during operation. The blocking extensions 1145 and 1150 can contact each the first arm 910 and the second arm 915 during operation to prohibit further movement of the receptacle 225 when it is subject to the receptacle force mechanism 975. Opposite the blocking extensions 1145 and 1150, a support extension 1160 may be present. The support extension 1160 may be in an offset position relative to the blocking extensions 1145 and 1150 as the support extension 1160 may be flanked and be positioned between the first arm 910 and the second arm 915 during operational use. The support extension 1160 may travel outward from the center point 1135 toward a second end of the receptacle 225. The support extension 1160 may extend outward from the receptacle bottom surface 1140 and be formed as part of the overall receptacle 225. Further, the support extension 1160 may travel outward a larger distance near the center point 1135 while gradually decreasing in outward distance as it nears termination at the first second of the receptacle 225.

In FIG. 11C, a receptacle side view 1110 is illustrated. As viewed in FIGS. 11A and 11B, the top rim 1115 is present that circumnavigates and creates the general shape of the receptacle 225. Further, the receptacle side wall 1120 is present and viewed traveling upward and angles outward from a receptacle bottom surface 1140 to the top rim 1115. Extending downward from the receptacle bottom surface 1140, the support extension 1160 is illustrated. The support extension 1160 may travel outward a larger distance near the center point 1135 while gradually decreasing in outward distance as it nears termination at the second end of the receptacle 225. Also extending downward from the receptacle bottom surface 1140, one of the plurality of blocking extensions 1145 and 1150, specifically blocking extension 1145 is illustrated. The blocking extension 1145 may travel outward a larger distance near the center point 1135 while gradually decreasing in outward distance as it nears termination at the first end of the receptacle 225.

Between the support extension 1160 and the plurality of blocking extensions 1145 and 1150, a receptacle connection 1165 is present. The receptacle connection 1165 may be a pivot point upon which the receptacle 225 can be moved to accommodate the presence of the elongated instrument 120. The receptacle connection 1165 may have a passage or opening. The passage or opening of the receptacle connection 1165 may be a location through which the receptacle connector 920, that may be a bolt or pin or the like, may be present to lock or secure the receptacle 225 to each the first arm 910 and second arm 915 of the retention apparatus 100. Below the receptacle connection 1165, a receptacle extension 1155 may be present. The receptacle extension 1155 is a portion of the receptacle that is the furthest from the receptacle bottom surface 1140. The receptacle extension 1155 extends downward from the receptacle connection 1165 and may have a through opening by which the receptacle force mechanism 975, and more particularly the second receptacle force mechanism end 980, may be secured to the receptacle 225. For example, the second receptacle force mechanism end 980 can be a hook of the helical spring that is secured to the receptacle extension 1155 to apply both tensile and compressive forces to the receptacle 225 during operation of the retention apparatus 100.

Figure 12B:
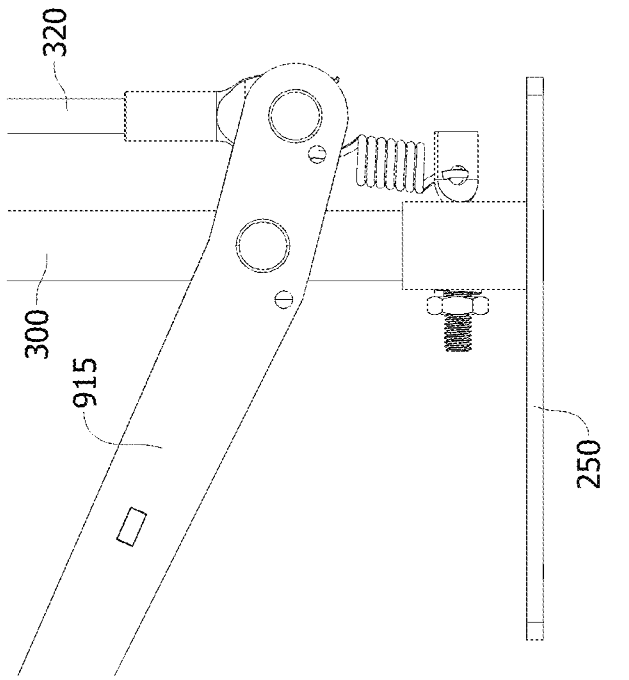
FIG. 12B shows a side view of components of the base portion with components of the bottom portion of the example retention apparatus in embodiment of the disclosure.
Figure 12A:
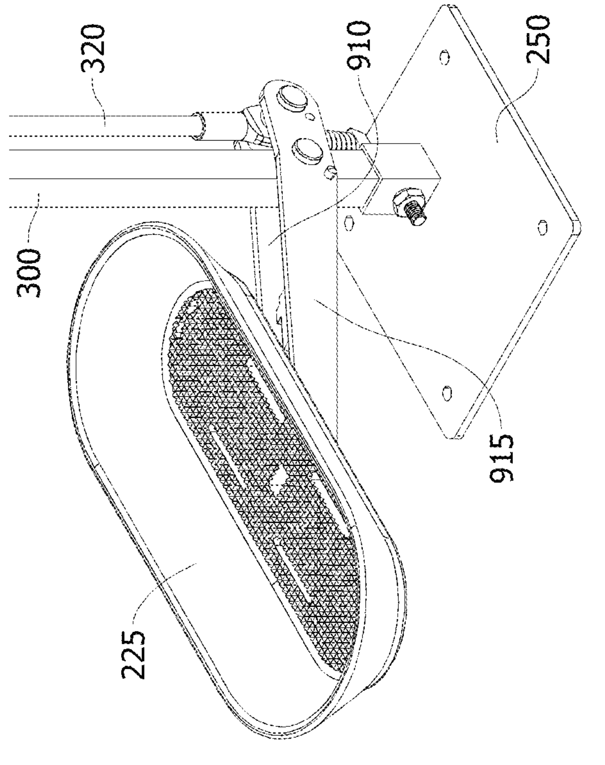
FIG. 12A shows a perspective view of components of a base portion with components of the bottom portion of the example retention apparatus in embodiment of the disclosure.

FIGS. 12A and 12B illustrate different components of the base 250 with components of the bottom portion 115 of the retention apparatus 100. In FIG. 12A, a base perspective view 1200 is illustrated. In FIG. 12B, a base side view 1200 is illustrated. The base 250 may be located below the bottom portion 115 of the retention apparatus 100. When the retention apparatus 100 is assembled, the receptacle 225 may be coupled to the first arm 910 and the second arm 915 of the bottom portion 115. Components and other fasteners may connect and couple each the first arm 910 and the second arm 915 to middle portion 110 components of the retention apparatus 100. For example, the first arm 910 and the second arm 915 may be coupled to the shaft 300 and also the first arm 910 and the second arm 915 may be coupled to the rod 320. The base 250 can then be coupled to middle portion 110 components as well. As illustrated in FIGS. 12A and 12B, the base can be coupled and connected to the shaft 300 through these fasteners.

Figure 13:
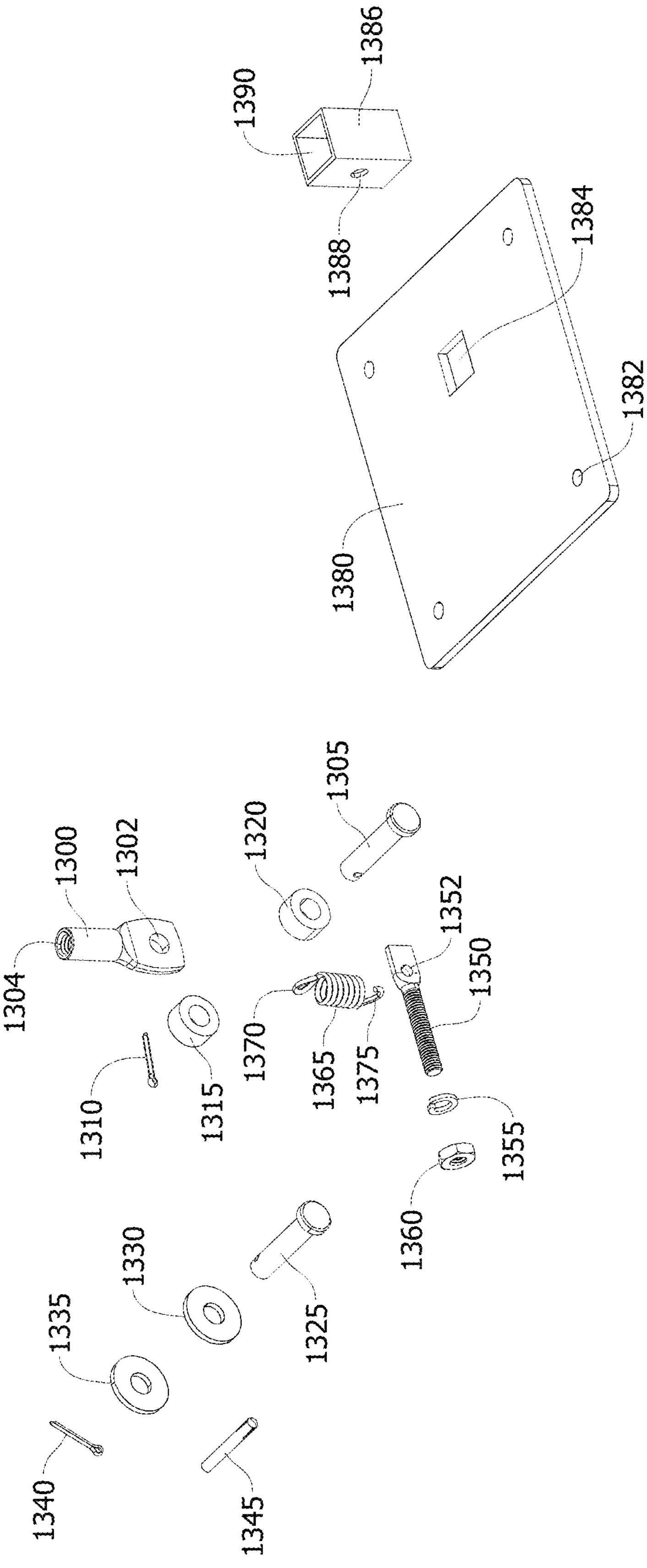
FIG. 13 shows an exploded view of base portion components and additional bottom portion components of the example retention apparatus in embodiment of the disclosure.

FIG. 13 shows an exploded view of base 250 components and additional components that work in conjunction with the bottom portion 115 of the retention apparatus 100. The viewed base 250 may include a base plate 1380. The base plate 1380 may be made of similar or the same material used with the other components of the retention apparatus 100. The base 250 generally and the base plate 1380 may be created with various metals or metallic alloys by way of custom cutting these metals or metallic alloys presented in a sheet form. Further, any cut metals or metallic alloys may then be folded or stamped appropriately with a metal fabrication tool or process to create the base 250 or the base plate 1380. Alternatively, the base 250 or the base plate 1380 may also be created by way of injection molding with the use of polymer or plastic type materials. In FIG. 13, for example, the base plate 1380 is presented as a piece of metallic sheeting that may be stamped to create its final design.

The base plate 1380 may be square in shape, but it should be understood that other dimensional sizes or configurations are possible. The base plate 1380 may have a base plate opening 1384. A base extension 1386 may fit within or around the base plate opening 1384. Further, the base plate 1380 may have a plurality of base openings 1382. The location and number of the plurality of base openings 1382 may vary and be determined by the user of the retention apparatus 100. As the base 250 and the base plate 1380 is to be able to rest on a surface, such as or not limited to the ground, dirt, gravel, wood, or concrete, the plurality of base openings 1382 may provide locations through which fasteners such as screws, bolts, or spikes may pass through the base plate 1380 and further secure the base plate 1380 to the underneath surface. The base extension 1386 may be located near or within the base plate opening 1384. In some envisioned embodiments, the base plate opening 1384 may be welded or affixed directly to the base plate 1380 or even formed with the base plate 1380 to create a consistent single material piece. The base extension 1386 may have a plurality of base extension sides. These base extension sides may create a hollow interior area that travels the length of the base extension 1386. A base extension opening 1390 may provide access to this hollow interior area of the base extension 1386 and allow for a space into which the shaft 300 of the retention apparatus 100 can be secured to the base 250. Further, the base extension 1386 may have a plurality of base extension openings 1388 present on select base extension sides. The plurality of base extension openings 1388 may be present on one of the base extension sides and may also have a corresponding opening on the opposite base extension side. In this manner, a fastening mechanism, such as a pin or tab, or base bolt 1350 may be positioned and placed through the plurality of base extension openings 1388 to secure the shaft 300 to a base 250 of the retention apparatus 100.

As stated above, the base bolt 1350 may travel through and secure the base extension 1386 coupled to the base plate 1380 to the shaft 300 through one of the plurality of base extension openings 1388. On the opposite base extension opening 1388, a base washer 1355 and base nut 1360 may be present. In some embodiments, the base bolt 1350 may be threaded. The base nut 1360 can be tightened to contact the base washer 1355 with a side wall of the base extension 1386 and secure the base bolt 1350 in the correct position. The base bolt 1350 may also have a bolt head 1352 that has a flatter configuration. The bolt head 1352 may have an opening through which a grasping force mechanism 1365 can be secured for operational use of the retention apparatus 100.

Also, in FIG. 13 the grasping force mechanism 1365 is viewed. The grasping force mechanism 1365 may be a type of fastener or component able to apply a force to each the base bolt 1350 and the rod bolt 1300 of the retention apparatus 100 to adjust possible positioning and orientation of the rod 320 during operation of the retention apparatus 100. The grasping force mechanism 1365 viewed in FIG. 13 is a rod spring, and a helical spring, but it should be understood that other possible force mechanisms or types of springs may be used as the grasping force mechanism 1365. A first grasping force mechanism end 1370 may be secured to the rod bolt 1300. For example, the first grasping force mechanism end 1370 can be a hook of the helical spring that is secured to the rod bolt 1300 that may be connected to the rod 320. Also, the grasping force mechanism 1365 may have a second grasping force mechanism end 1375. The second grasping force mechanism end 1375 may connect to the force mechanism opening 950 on either the first arm 910 or the second arm 915. In this manner and fashion, both tensile and compressive forces may be applied to each the base bolt 1350 and rod bolt 1300, and in turn the rod 320, by the grasping force mechanism 1365 during operation of the retention apparatus 100.

The rod bolt 1300 may be connected to the bottom portion 115 of the retention apparatus 100 through the through rod openings 955 present on each the first arm 910 and the second arm 915. The rod bolt 1300 may have a threaded top end 1304. The threaded top end 1304 can be secured to the rod 320 directly, for example, through the threading mating connection between the threaded top end 1304 and the threaded rod 320. The rod bolt 1300 may also have a rod bolt head 1302. The rod bolt head 1302 may have an opening through which a rod pin 1305 can be secured for operational use of the retention apparatus 100. Further, without a direct affixed connection to the rod bolt 1300, the rod pin 1305 may allow the rod 320 to move freely as necessary with operational movement of the retention apparatus 100. The rod pin 1305 may be secured on an opposing end of a rod pin head with a rod lock 1310. The rod lock 1310 can secure placement of the rod pin 1305 in the correct interconnected orientation for operational use of the retention apparatus 100.

Additionally, a first rod spacer 1315 may be present and located adjacent the rod opening 955 of the first arm 910 and the rod bolt 1300. A hole or opening may be present through the middle area of the first rod spacer 1315 where the rod pin 1305 may pass when the retention apparatus 100 is in the assembled configuration. A second rod spacer 1320 may be present and located adjacent the rod opening 955 of the second arm 915 and the rod bolt 1300. A hole or opening may be present through the middle area of the second rod spacer 1320 where the rod pin 1305 may pass when the retention apparatus 100 is in the assembled configuration.

A shaft pin 1325 may also be present for operational use of the retention apparatus 100. The shaft pin 1325 may couple each the first arm 910 and the second arm 915 to the shaft 300. The shaft pin 1325 may allow for movement between its secured components. As such, the bottom portion 115 components including the first arm 910 and the second arm 915 may move freely as necessary with operational movement of the retention apparatus 100 and pivot upon the shaft pin 1325. The shaft pin 1325 may be secured on an opposing end of a shaft pin head with a shaft lock 1340. The shaft lock 1340 can secure placement of the shaft pin 1325 in the correct interconnected orientation for operational use of the retention apparatus 100.

Further, a first shaft spacer 1335 may be present and located adjacent the shaft opening 945 of the first arm 910 and the shaft pin 1325. A hole or opening may be present through the middle area of the first shaft spacer 1335 where the shaft pin 1325 may pass when the retention apparatus 100 is in the assembled configuration. A second shaft spacer 1330 may be present and located adjacent the shaft opening 945 of the second arm 915 and the shaft pin 1325. A hole or opening may be present through the middle area of the second shaft spacer 1330 where the shaft pin 1325 may pass when the retention apparatus 100 is in the assembled configuration. A blocker 1345 may be placed within the arm block 940 present on each the first arm 910 and the second arm 915.

Figure 14:
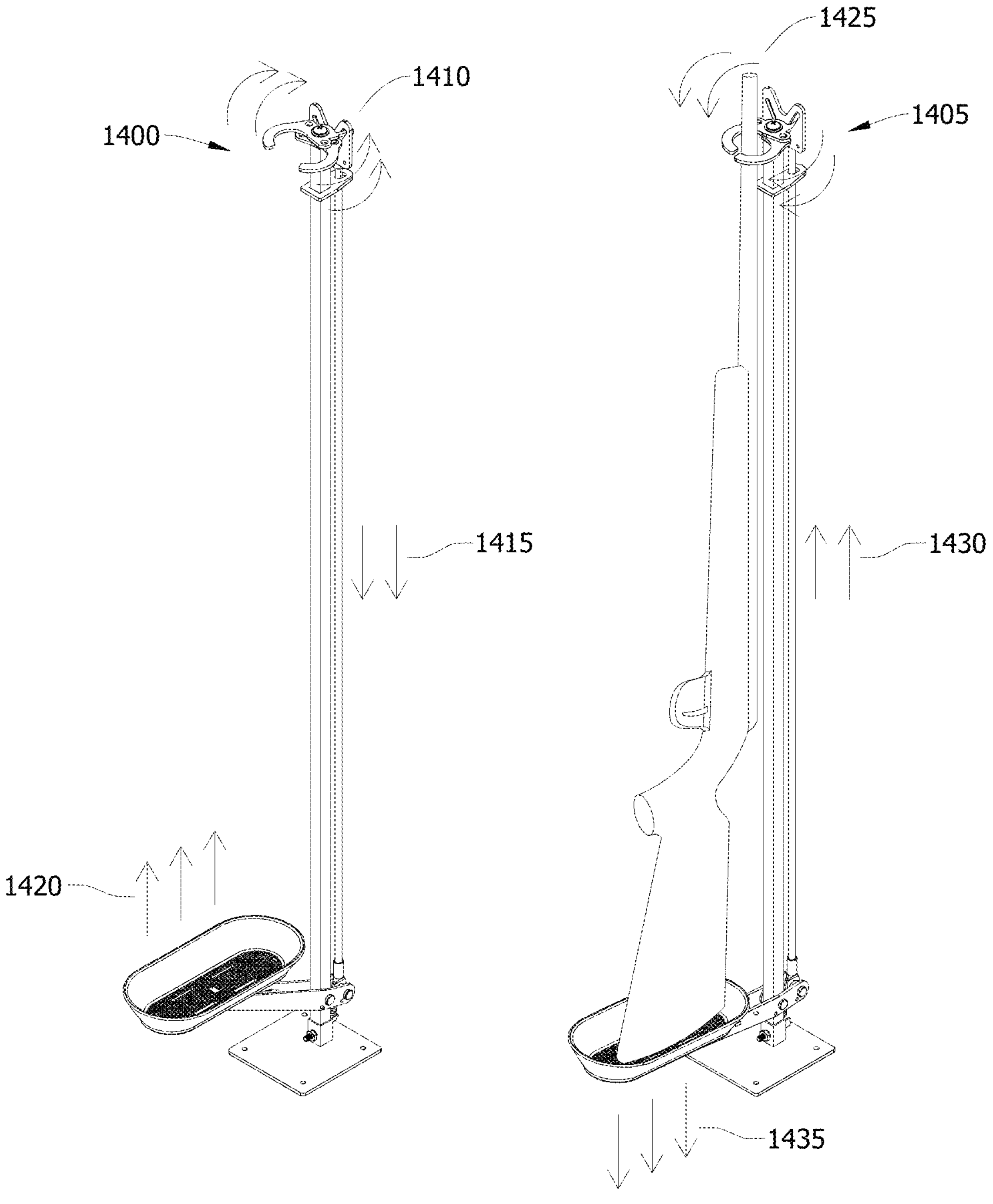
FIG. 14 illustrates operative positions and movement of the example retention apparatus in each an open position and a closed position securing the elongated instrument in accordance with an embodiment of the disclosure.

As viewed in FIG. 14, operative positions and movement forces are shown of the retention apparatus 100 in each the open position and the closed position securing the elongated instrument 120. The first view of FIG. 14 is like the view presented and described earlier with respect to FIG. 2. Here, the retention apparatus 100 is viewed in the open position and able to receive the elongated instrument 120. In the open position, the first clasp 500 is subject to a first clasp opening force 1400 based on the location of the back plate extension 725 of the first clasp 500 within back plate 510. Also, the second clasp 505 is subject to a second clasp opening force 1410 based on the location of the back plate extension 760 of the second clasp 505 within back plate 510. The rod viewed in the first image is subject to a downward grasping force 1415 based on the compression force of the grasping force mechanism 1365 pulling the bottom portion 115, via either the first arm 910 or the second arm 915, in a downward direction. As the grasping force mechanism 1365 pulls either the first arm 910 or the second arm 915 in a downward direction, the force results in upward receptacle movement 1420. The upward receptacle movement 1420 lifts the receptacle 225 to an elevated position where it is ready to receive an elongated instrument 120.

The second view of FIG. 14 is like the view presented and described earlier with respect to FIG. 1. Here, the retention apparatus 100 is viewed in the closed or securing position where it is securing the elongated instrument 120. In the closed or securing position, the first clasp 500 is subject to a first clasp closing force 1425 based on the location of the back plate extension 725 of the first clasp 500 within back plate 510. In the closed or securing position, the position of the back plate extension 725 of the first clasp 500 within back plate 510 is at a lower location within the first back plate channel 520 than it is in the open position of the retention apparatus 100. Also, the second clasp 505 is subject to a second clasp closing force 1405 based on the location of the back plate extension 760 of the second clasp 505 within back plate 510. In the closed or securing position, the position of the back plate extension 760 of the second clasp 505 within back plate 510 is at a lower location within the second back plate channel 525 than it is in the open position of the retention apparatus 100. The rod viewed in the second image is subject to an upward rod movement 1430 based upon placement and the weight of the elongated instrument 120 being placed within receptacle 225. The upward rod movement 1430 pushes the back plate 510 upward to in turn move each the back plate extension 725 of the first clasp 500 and the back plate extension 760 of the second clasp 505 to their lower positions within their respective channels on the back plate 510. As the elongated instrument 120 is placed into the receptacle 225, a downward receptacle movement 1435 occurs. The downward receptacle movement 1435 is caused by the weight of the elongated instrument 120 being placed and held within the receptacle 225. In turn, the downward receptacle movement 1435 causes the grasping force mechanism 1365 to expand and increase the tensile forces applied to the components and portions of the retention apparatus. Thus, grasping force mechanism 1365 wishes to return to the compressed state and will do so automatically when the elongated instrument 120 is removed from the receptacle 225 for use by the end user.

Figure 15A:
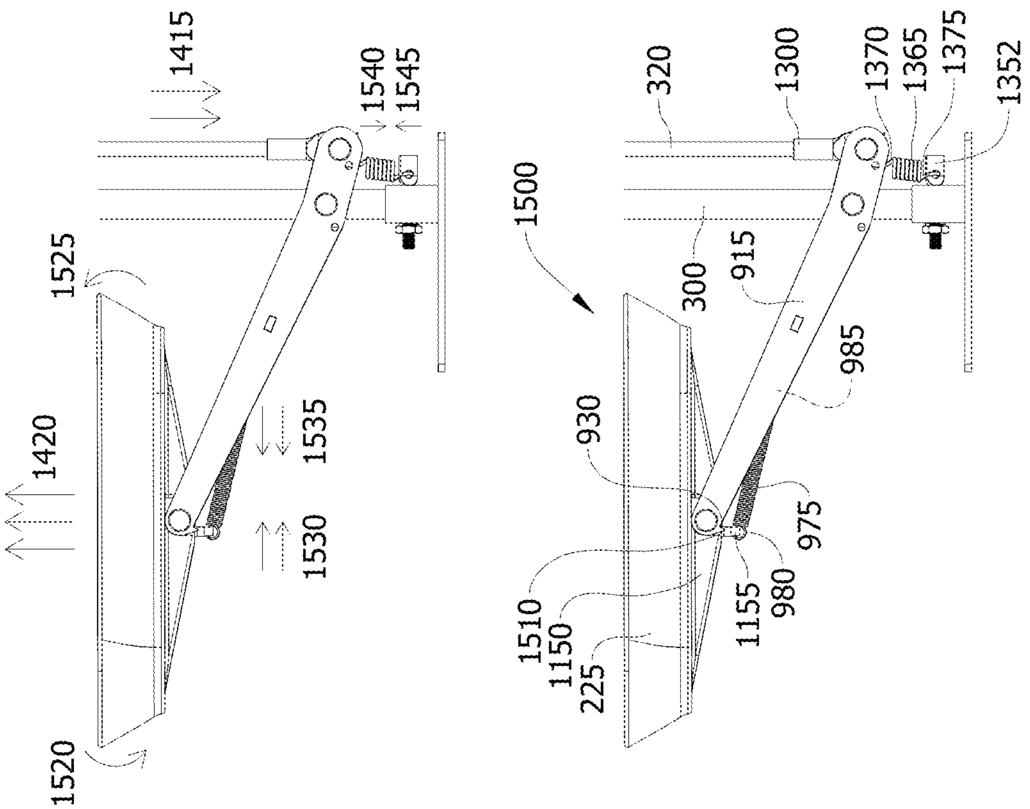
FIG. 15A illustrates operative positions and movement of components of the bottom portion of the example retention apparatus in the open position in accordance with an embodiment of the disclosure.
Figure 15B:
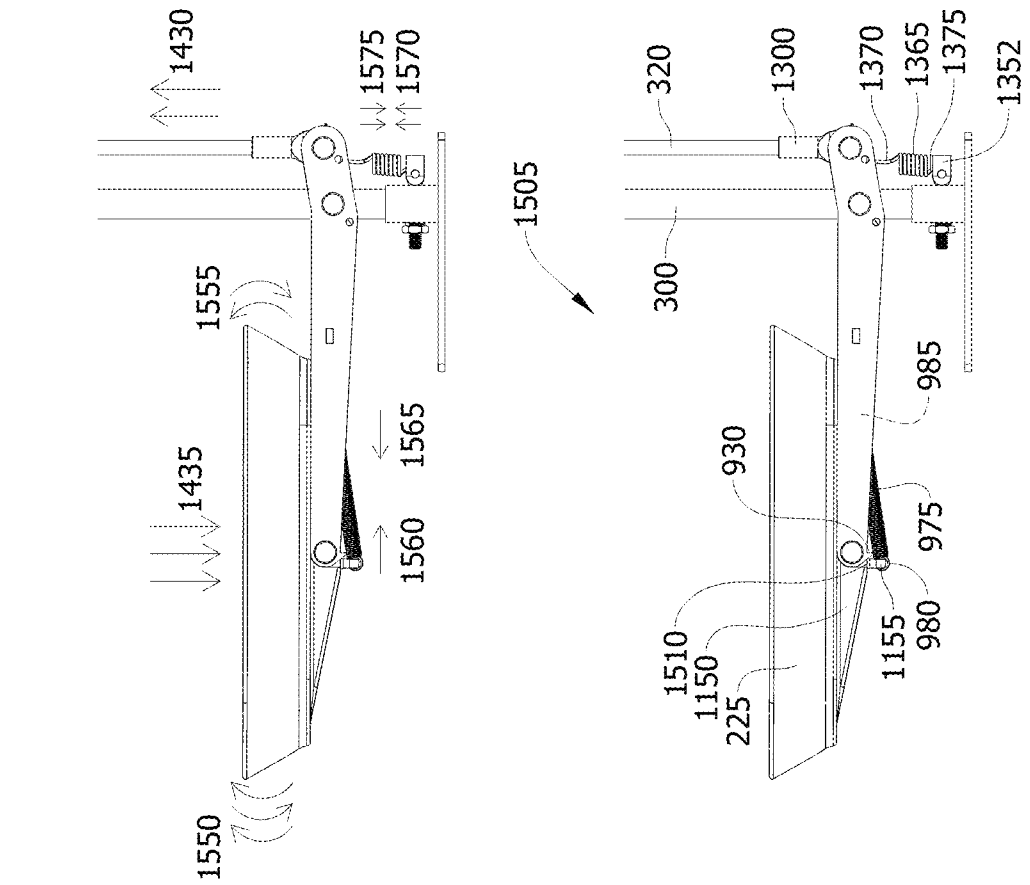
FIG. 15B illustrates operative positions and movement of components of the bottom portion of the example retention apparatus in the closed position securing the elongated instrument in accordance with an embodiment of the disclosure.

FIGS. 15A and 15B illustrate the operative positions and movement forces occurring with the bottom portion 115 of the retention apparatus 100 in each the open position and the closed position securing the elongated instrument 120. Here, In the open position of FIG. 15A, the retention apparatus 100 is subject to the downward grasping force 1415 based on the compression force of the grasping force mechanism 1365 pulling the bottom portion 115, via either the first arm 910 or the second arm 915, in a downward direction. As the grasping force mechanism 1365 pulls either the first arm 910 or the second arm 915 in a downward direction, the force results in upward receptacle movement 1420. The upward receptacle movement 1420 lifts the receptacle 225 to an elevated position where it is ready to receive an elongated instrument 120.

The grasping force mechanism 1365 applies the compression force via a downward rod compression force 1540 and an upward base bolt compression force 1545. The grasping force mechanism 1365 wishes to be maintained in the compressed position and would prefer to do so until another greater force acts upon the retention apparatus 100 to overcome its resting downward rod compression force 1540 and an upward base bolt compression force 1545.

Further, the receptacle force mechanism 975 is viewed with its corresponding forces. In the open position, the receptacle force mechanism 975 applies its greatest compressive force via a receptacle pulling force 1530 towards the shaft area of the retention apparatus 100. At the same time, the receptacle force mechanism 975 applies its greatest compressive force via an arm pulling force 1535 towards the receptacle 225. The forces applied by the receptacle force mechanism 975 act upon the receptacle 225. A far end of the receptacle 225 desires to rotate downward 1520 as it is pulled by the receptacle force mechanism 975. Conversely, the near end of the receptacle 225 desires to rotate upward 1525 as it is pulled by the receptacle force mechanism 975. A blocking point 1510 is present where a blocking extension 1150 may contact an arm block 930 of either the first arm 910 or the second arm 915, and in some instances the hook extension 928, to prevent further movement of the receptacle 225. In an open position and configuration as viewed in FIG. 15A, the blocking point 1510 is closed thus only a minimal surface, if any, of the blocking extension 1150 is viewable. Thus, in the open position the receptacle 225 is presented to the user in a level position and able to accept an elongated instrument 120.

FIG. 15B illustrates the operative position and movement forces occurring with the bottom portion 115 of the retention apparatus 100 in the closed position securing the elongated instrument 120. Here, the retention apparatus 100 is subject to an upward rod movement 1430 based upon placement and the weight of the elongated instrument 120 being placed within receptacle 225. The upward rod movement 1430 pushes the back plate 510 upward. As the elongated instrument 120 is placed into the receptacle 225, a downward receptacle movement 1435 occurs. The downward receptacle movement 1435 is caused by the weight of the elongated instrument 120 being placed and held within the receptacle 225. In turn, the downward receptacle movement 1435 causes the grasping force mechanism 1365 to expand and increase the tensile forces applied to the components and portions of the retention apparatus. Thus, grasping force mechanism 1365 wishes to return to the compressed state and will do so automatically when the elongated instrument 120 is removed from the receptacle 225 for use by the end user.

The grasping force mechanism 1365 in the closed or securing position is out of its normal position and subject to increased tensile forces. These include an increased upward rod tensile force 1575 and an increased downward base bolt tensile force 1570. The grasping force mechanism 1365 wishes to return to the compressed position and would prefer to do so to remove these tensile forces.

Further, the receptacle force mechanism 975 is viewed with its corresponding forces. In the closed or securing position, the receptacle force mechanism 975 applies lesser compressive force via a lesser receptacle pulling force 1560 towards the shaft area of the retention apparatus 100. At the same time, the receptacle force mechanism 975 applies a lesser compressive force via a lesser arm pulling force 1565 towards the receptacle 225. The forces applied by the receptacle force mechanism 975 act upon the receptacle 225. However, these forces acting upon the receptacle 225 must also contend with the forces applied by the placed elongated instrument 120. The results are a type of self-leveling action by the wherein the forces applied to the ends or the receptacle 225 are continuously balanced and eventually maintained equally so that the position of the elongated instrument 120 remains level with a horizontal plane as the bottom portion 115 of the retention apparatus 100 moves downwards. In some instances, this will result in the receptacle 225 contacting and resting upon each the first arm 910 and the second arm 915 of the retention apparatus 100. In the closed position, the receptacle 225 is subject to a first end averaging force 1550 and a second end averaging force 1555. The blocking point 1510 is also present. In the open configuration, the blocking extension 1150 may contact an arm block 930 of either the first arm 910 or the second arm 915, and in some instances the hook extension 928, to prevent further movement of the receptacle 225. In the closed position and configuration where the elongated instrument 120 is within receptacle 225 (not shown) as viewed in FIG. 15 B, the blocking point 1510 is open. In the open blocking point 1510 position, the blocking point 1510 allows for a user to view a portion of surface area of the blocking extension 1150. It should be understood that in the open blocking point 1510 position, this viewable surface area of creates the blocking point 1510 and is a portion of the blocking extension 1150 that would not be viewable when the blocking point 1510 is in the closed position or if the retention apparatus 100 is in the open position without holding an item or elongated instrument 120. Thus, in the closed or securing position the receptacle 225 is presented to the user in a level position, constantly adjusting and adjustable by the first end averaging force 1550 and the second end averaging force 1555, and able to accept and retain the elongated instrument 120.

Figure 16B:
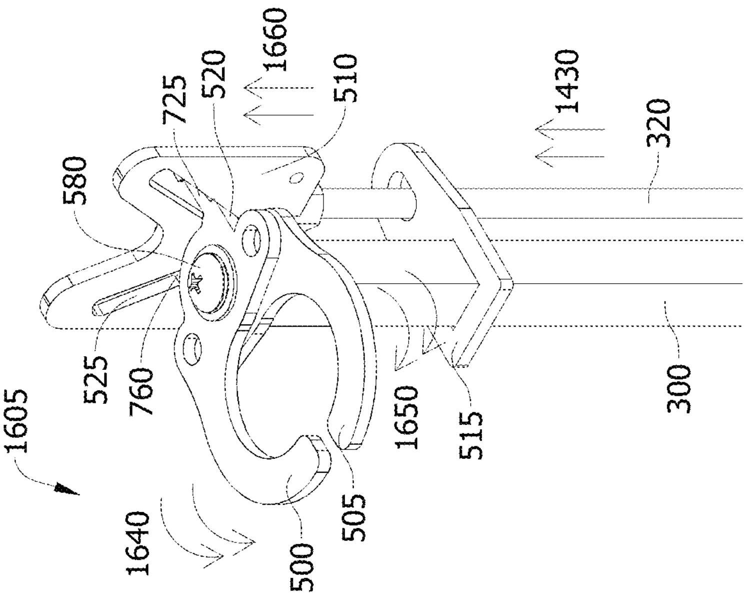
FIG. 16B illustrates operative positions and movement of components of the top portion of the example retention apparatus in the closed position securing the elongated instrument in accordance with an embodiment of the disclosure.
Figure 16A:
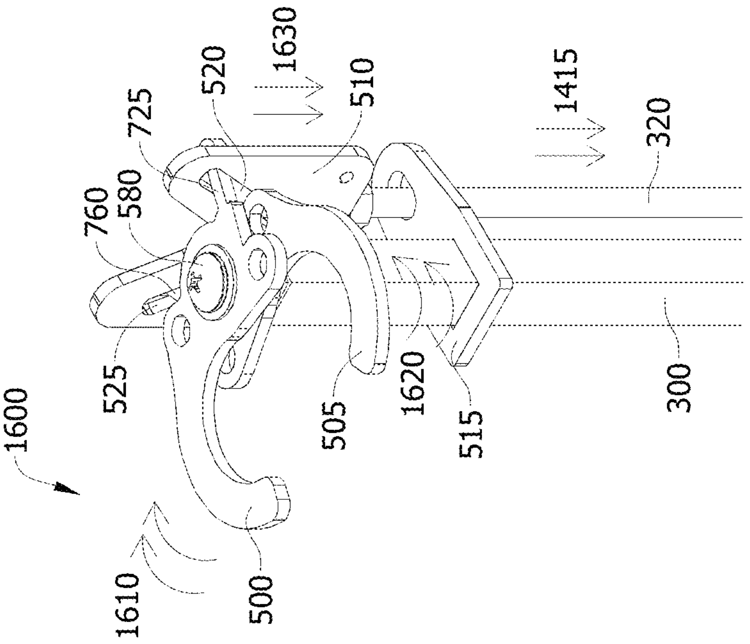
FIG. 16A illustrates operative positions and movement of components of the top portion of the example retention apparatus in the open position in accordance with an embodiment of the disclosure.

FIGS. 16A and 16B illustrate the operative positions and movement forces occurring with the top portion 105 of the retention apparatus 100 in each the open grasping position 1600 and the closed grasping position 1605 securing the elongated instrument 120. Here, In the open grasping position of FIG. 16A, the retention apparatus 100 is subject to the downward grasping force 1415 based on the compression force of the grasping force mechanism 1365 pulling the bottom portion 115, via either the first arm 910 or the second arm 915, in a downward direction. The grasping force mechanism 1365 applies the compression force via a downward rod compression force 1540 and an upward base bolt compression force 1545. The grasping force mechanism 1365 wishes to be maintained in the compressed position and would prefer to do so until another greater force acts upon the retention apparatus 100 to overcome its resting downward rod compression force 1540 and an upward base bolt compression force 1545. In doing so, the rod 320 being coupled to the back plate 510 transfers the downward grasping force 1415 to also be present and applied as a back plate downward force 1630.

Further FIG. 16A illustrates the top portion 105 of the retention apparatus 100 in the open position and able to receive the elongated instrument 120. In the open grasping position, the first clasp 500 is subject to a first clasp opening force 1610 based on the location of the back plate extension 725 of the first clasp 500 within back plate 510. Also, the second clasp 505 is subject to a second clasp opening force 1620 based on the location of the back plate extension 760 of the second clasp 505 within back plate 510.

The view of FIG. 16B shows the retention apparatus 100 in the closed grasping or securing position where it is securing the elongated instrument 120. In the closed grasping or securing position, the first clasp 500 is subject to a first clasp closing force 1640 based on the location of the back plate extension 725 of the first clasp 500 within back plate 510. In the closed grasping or securing position, the position of the back plate extension 725 of the first clasp 500 within back plate 510 is at a lower location within the first back plate channel 520 than it is in the open position of the retention apparatus 100. Also, the second clasp 505 is subject to a second clasp closing force 1650 based on the location of the back plate extension 760 of the second clasp 505 within back plate 510. In the closed or securing position, the position of the back plate extension 760 of the second clasp 505 within back plate 510 is at a lower location within the second back plate channel 525 than it is in the open position of the retention apparatus 100. The rod 320 is subject to an upward rod movement 1430 based upon placement and the weight of the elongated instrument 120 being placed within receptacle 225. The upward rod movement 1430 pushes the back plate 510 upward to in turn move each the back plate extension 725 of the first clasp 500 and the back plate extension 760 of the second clasp 505 to their lower positions within their respective channels on the back plate 510. Thus, the rod 320 transfers the upward rod movement 1430 to also be present and applied as a back plate upward movement 1660.

Figure 17:
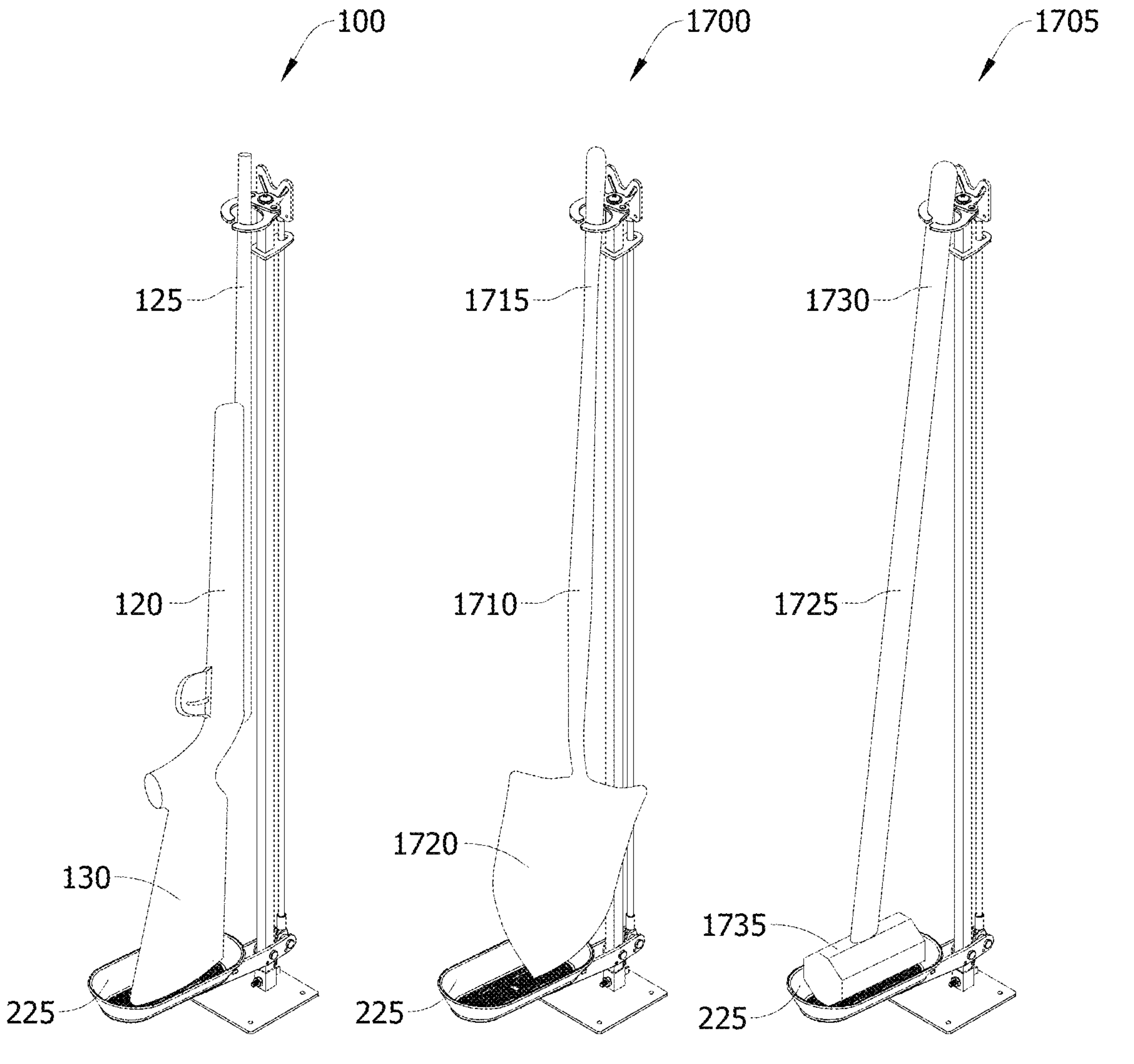
FIG. 17 alternative elongated instruments that may be secured by the example retention apparatus in accordance with an embodiment of the disclosure.

Turning now to FIG. 17, alternative elongated instruments are viewed that may be secured by the retention apparatus 100. The elongated instrument 120 may be any type of product generally having a large length that requires some type of securing operation at opposite ends to safely secure the elongated instrument 120. For example, the elongated instrument 120 may be a firearm such as a rifle, long barrel rifle, or a shotgun viewed with use in conjunction with retention apparatus 100. In other embodiments, the elongated instrument 120 may be a tool such as a gardening tool like a rake, shovel, or hoe, or a working tool such as a hammer or axe. Multiple items of various operational uses can present as the elongated tool 120, and the retention apparatus 100, by way of the middle portion 110 and any possible modifications, can be used to accommodate any various size limitations of the elongated instrument 120.

As viewed in the figure, a firearm is viewed as the elongated instrument 120 with use in conjunction with retention apparatus 100. The elongated instrument 120 may have a top end 125 and a bottom end 130. The retention apparatus 100, when placed in the open position, can accommodate, and secure the elongated instrument 120 through the combination of placement of connective operational features. To secure the elongated instrument 120 and place the retention apparatus 100 into the securing position, the bottom end 130 of the elongated instrument 120 may be placed within the receptacle 225 of the bottom portion 115 of the retention apparatus 100. Then, the top end 125 of the elongated instrument 120 may be positionally located approximate the securing type of mechanism located at the top portion 105 of the retention apparatus 100. The weight of the elongated instrument 120 may lower the bottom portion 115 of the retention apparatus 100. Lowering of the bottom portion 115 may cause interactive movement communication via a set of actions by components of each the bottom portion 115, middle portion 110, and top portion 105 of the retention apparatus 100 such that the securing type of mechanism located at the top portion 105 of the retention apparatus 100 may grasp and secure the top end 125 of the elongated instrument 120. In this manner, the retention apparatus 100 secures the elongated instrument 120. Further, the retention apparatus 100 self-secures and continues to self-secure the elongated instrument 120 so long at the bottom end 130 of the elongated instrument 120 remains within the receptacle 225 of the bottom portion 115 of the retention apparatus 100. In this manner, the weight of the elongated instrument 120 allows the top end 125 of the elongated instrument 120 to remain self-secured by the top portion 105 of the retention apparatus 100.

In a secondary example a shovel 1710 is viewed as the elongated instrument 120 with use in conjunction with retention apparatus 1700. The shovel 1710 may have a top shovel end 1715 and a bottom shovel end 1720. The retention apparatus 100, when placed in the open position, can accommodate, and secure the shovel 1710 through the combination of placement of connective operational features. To secure the shovel 1710 and place the retention apparatus 100 into the securing position, the bottom shovel end 1720 may be placed within the receptacle 225 of the retention apparatus 100. Then, the top shovel end 1715 of the shovel 1710 may be positionally located approximate the securing type of mechanism located at the top portion 105 of the retention apparatus 100. The weight of the shovel 1710 may lower the bottom portion 115 of the retention apparatus 100 and secure the top shovel end 1715 in the same manner described earlier and throughout this description.

In a third example a hammer 1725 is viewed as the elongated instrument 120 with use in conjunction with retention apparatus 1705. The hammer 1725 may have a top hammer end 1730 and a bottom hammer end 1735. The retention apparatus 100, when placed in the open position, can accommodate, and secure the hammer 1725 through the combination of placement of connective operational features. To secure the hammer 1725 and place the retention apparatus 100 into the securing position, the bottom hammer end 1735 may be placed within the receptacle 225 of the retention apparatus 100. Then, the top hammer end 1730 of the hammer 1725 may be positionally located approximate the securing type of mechanism located at the top portion 105 of the retention apparatus 100. The weight of the hammer 1725 may lower the bottom portion 115 of the retention apparatus 100 and secure the top hammer end 1730 in the same manner described earlier and throughout this description.

Figure 18:
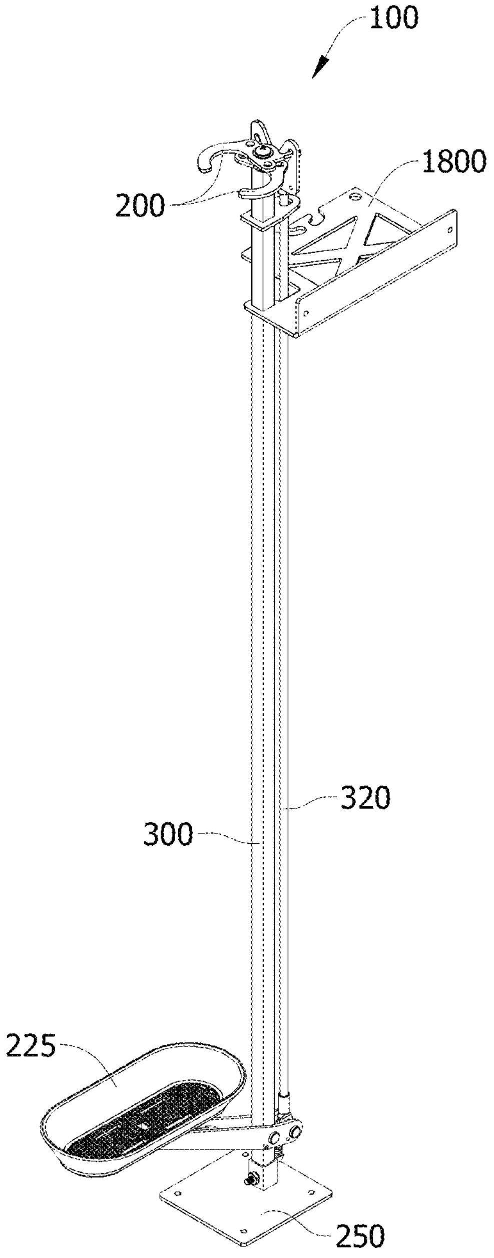
FIG. 18 illustrates a shelf attachment usable with the example retention apparatus in accordance with an embodiment of the disclosure.
Figure 19B:
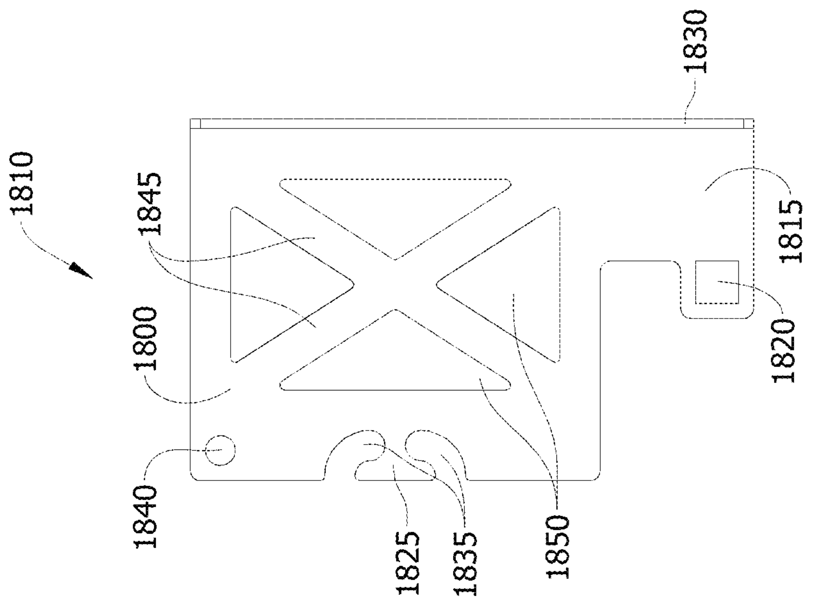
FIG. 19B shows a top side view of the shelf attachment removed from the example retention apparatus in accordance with an embodiment of the disclosure.
Figure 19A:
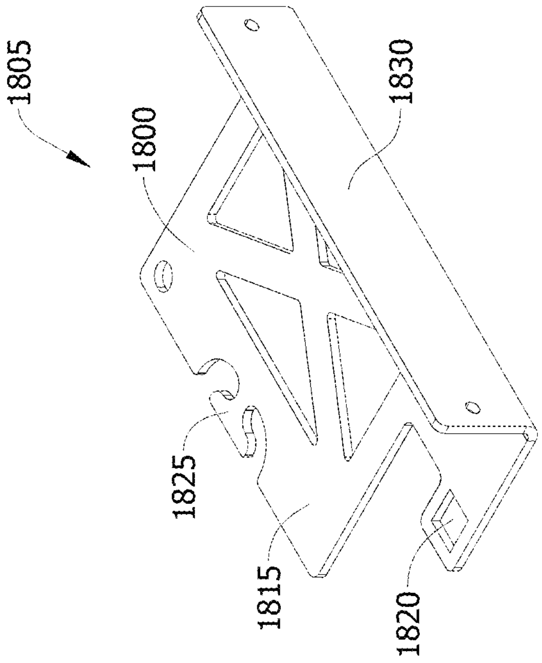
FIG. 19A shows a perspective view of the shelf attachment removed from the example retention apparatus in accordance with an embodiment of the disclosure.

FIGS. 18, 19A, and 19B illustrates an accessory that may be usable with the retention apparatus 100. The retention apparatus 100 may include a shelf 1800. In FIG. 19A, the shelf 1800 is viewed in a perspective position 1805. The shelf may have a generally flat and planar shelf surface 1815. Boxes or other types of items may rest on the shelf surface 1815. The shelf may also have a shaft opening 1820. To secure the shelf 1800 to the retention apparatus 100, the shelf 1800 may be fit over and around the shaft 300 during assembly. From there, the shelf 1800 and its position along the shaft 300 can be adjusted by the user of the retention apparatus 100. The shelf 1800 may also have a shelf hook 1825. The shelf hook may be created so that items can be attached to and hung by the shelf hook 1825 when the shelf 1800 is employed with the retention apparatus 100. The shelf 1800 may also have a side wall 1830. The side wall 1830 may be normal to the shelf surface 1815 to provide a storage type barrier for any items stored on the shelf surface 1815.

A top-down shelf view 1810 of shelf 1800 is illustrated in FIG. 19B. The shelf surface 1815 may have a crossing rail 1845 to hold items and provide an easy grasping point for movement of the shelf 1800. There may also be a plurality of shelf openings 1850 through the shelf surface 1815. This plurality of shelf openings 1850 can allow for drainage of debris that may be present on the shelf 1800. There may also be a shelf attachment opening 1840 where other connectors can be attached and secured to the shelf 1800. Near the shelf hook 1825, shelf hook cut outs 1835 may be present. These shelf hook cut outs 1835 may facilitate easier connection for items to be secured by the shelf hook 1825.

Figure 20:
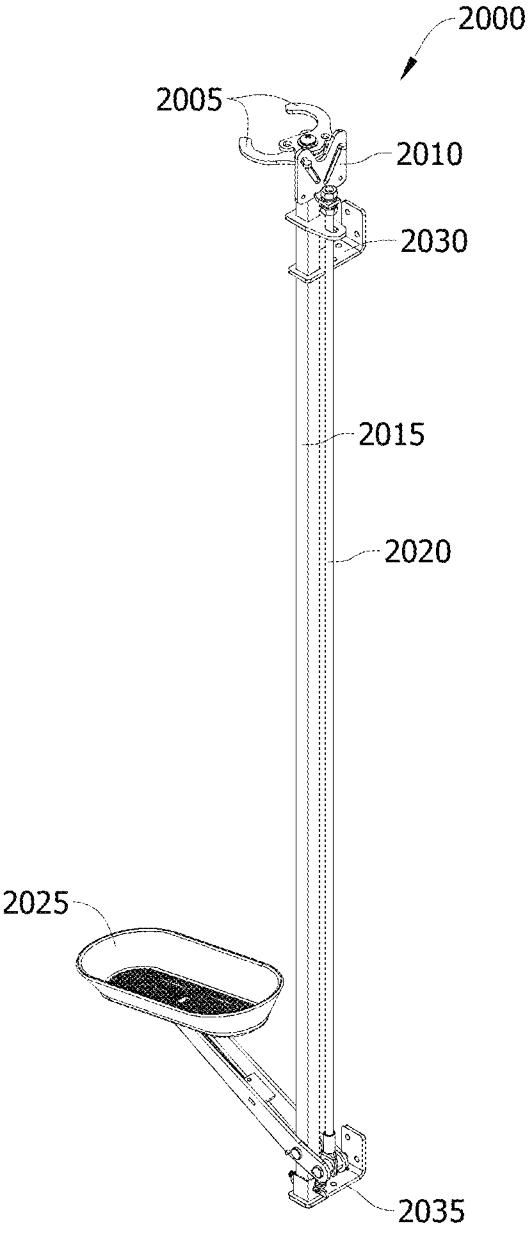
FIG. 20 illustrates a second example retention apparatus in accordance with an alternate embodiment of the disclosure.

FIG. 20 illustrates a second embodiment of the retention apparatus 2000. In FIG. 20, the retention apparatus 2000 is illustrated in an open position. The retention apparatus 2000, as discussed earlier, may have a plurality of portion like sections. A top portion may employ a grasping mechanism 2005 in part coupled to a back plate 2010. The grasping mechanism 2005 is a component of the retention apparatus 2000 that can secure a top end 125 of the elongated instrument 120 to the retention apparatus 2000. The grasping mechanism 2005 is envisioned to have multiple diverse types of configurations or possible designs. However, the grasping mechanism 2005 should be able to operate with the other components of the retention apparatus 2000 so that any desired elongated instrument 120 can be secured by the grasping mechanism 2005. The grasping mechanism 2005 with the back plate 2010 can actuate between an open and closed position based on the retention apparatus 2000 being in either its open position or securing position. The retention apparatus 2000 may also have a shaft 2015 and a rod 2020 present within the middle portion of the retention apparatus 2000. Further, the bottom portion of the retention apparatus may have a receptacle 2025. The retention apparatus 2000 should be understood to have the same or similar functionality as the earlier retention apparatus 100 discussed above. Also present with the retention apparatus 2000 is a first securing bracket 2030 and a second securing bracket 2035. Each the first securing bracket 2030 and the second securing bracket 2035 allow the retention apparatus 2000 to be secured to different locations.

Figure 21A:
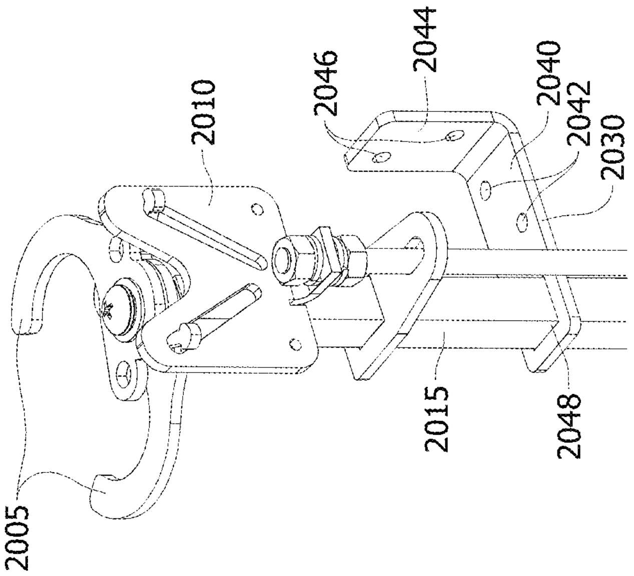
FIG. 21A shows a first securing bracket of the second example retention apparatus in accordance with an alternate embodiment of the disclosure.

FIG. 21A shows the first securing bracket 2030 in an example position near the grasping mechanism 2005 and back plate 2010 of the retention apparatus 2000. The first securing bracket 2030 may have a first securing bracket opening 2048. A shaft 2015 of the retention apparatus 2000 may fit within and through the first securing bracket opening 2048. In some embodiments, the first securing bracket 2030 may be directly secured, affixed, or welded to the shaft 2015. The first securing bracket 2030 may have a horizontal surface 2040 and a vertical surface 2044 that may be normal to the horizontal surface 2040. The horizontal surface 2040 may have a plurality of horizontal surface openings 2042. The vertical surface 2044 may also have a plurality of vertical surface openings 2046. Each the plurality of horizontal surface openings 2042 and the plurality of vertical surface openings 2046 may be able to receive a screw, bolt, nail, stake, or any other type of fastener to secure the retention apparatus 2000 to a side wall or other structure.

Figure 21B:
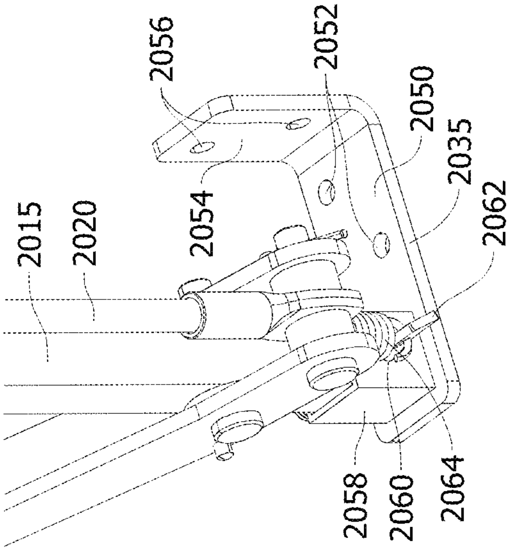
FIG. 21B shows a second securing bracket of the second example retention apparatus in accordance with an alternate embodiment of the disclosure.

FIG. 21B shows the second securing bracket 2035 in an example position near the terminal end of the shaft 2015 and rod 2020 of the retention apparatus 2000. The second securing bracket 2035 may have a shaft holder 2058 that can accept and contain the shaft 2015. Further, the shaft holder 2058 may have a bolt opening 2060 where a bolt 2062 can pass through and be secured to each the shaft 2015 and the shaft holder 2058. The bolt 2062 may be one of the attaching points of a grasping force mechanism 2064 while the other end may attach to one of the arms of the bottom portion of the retention apparatus 2000. The second securing bracket 2035 may have a horizontal surface 2050 and a vertical surface 2054 that may be normal to the horizontal surface 2050. The horizontal surface 2050 may have a plurality of horizontal surface openings 2052. The vertical surface 2054 may also have a plurality of vertical surface openings 2056. Each the plurality of horizontal surface openings 2052 and the plurality of vertical surface openings 2056 may be able to receive a screw, bolt, nail, stake, or any other type of fastener to secure the retention apparatus 2000 to a side wall or other structure.

Figure 22:
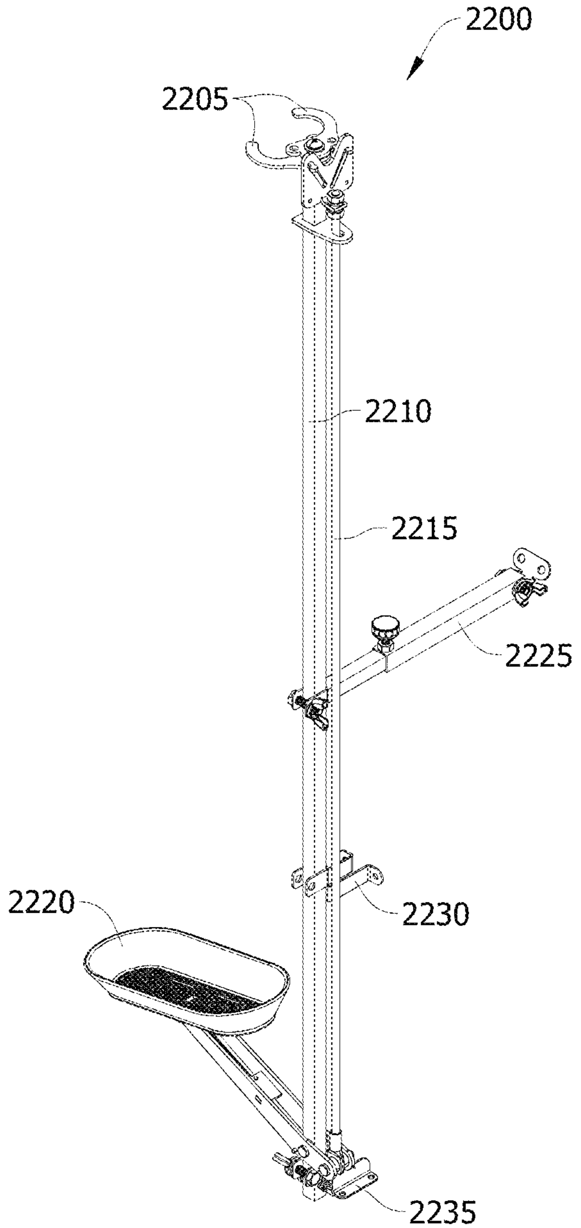
FIG. 22 illustrates a third example retention apparatus in accordance with another alternate embodiment of the disclosure.

FIG. 22 illustrates a third embodiment of the retention apparatus 2200. In FIG. 22, the retention apparatus 2200 is illustrated in an open position. The retention apparatus 2200, as discussed earlier, may have a plurality of portion like sections. A top portion may employ a grasping mechanism 2205 in part coupled to a back plate. The grasping mechanism 2205 is a component of the retention apparatus 2200 that can secure a top end 125 of the elongated instrument 120 to the retention apparatus 2200. The grasping mechanism 2205 is envisioned to have multiple diverse types of configurations or possible designs. However, the grasping mechanism 2205 should be able to operate with the other components of the retention apparatus 2200 so that any desired elongated instrument 120 can be secured by the grasping mechanism 2205. The grasping mechanism 2205 with the back plate can actuate between an open and closed position based on the retention apparatus 2200 being in either its open position or securing position. The retention apparatus 2200 may also have a shaft 2210 and a rod 2215 present within the middle portion of the retention apparatus 2200. Further, the bottom portion of the retention apparatus may have a receptacle 2220. The retention apparatus 2200 should be understood to have the same or similar functionality as the earlier retention apparatus 100 discussed above. Also present with the retention apparatus 2200 is a securing arm 2225, a first securing bracket 2230, and a second securing bracket 2235. Each the securing arm 2225, the first securing bracket 2230, and the second securing bracket 2235 allow the retention apparatus 2200 to be secured to different locations including a marine vessel.

Figure 23C:
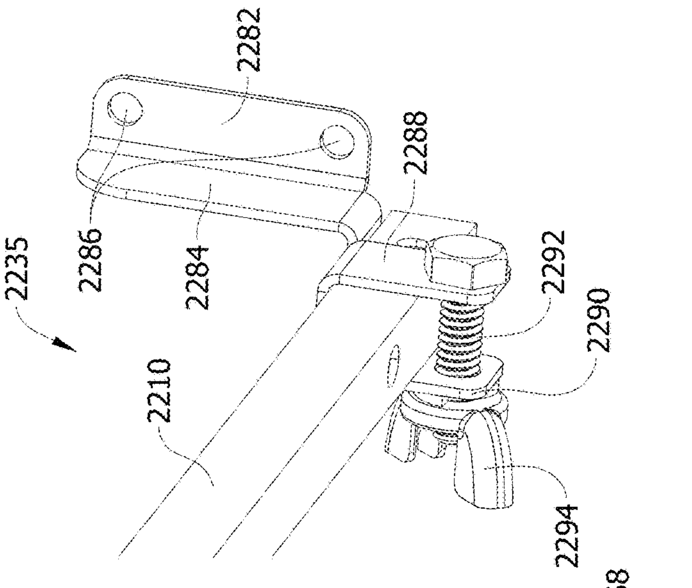
FIG. 23C shows a second securing bracket of the third example retention apparatus in accordance with another alternate embodiment of the disclosure.
Figure 23B:
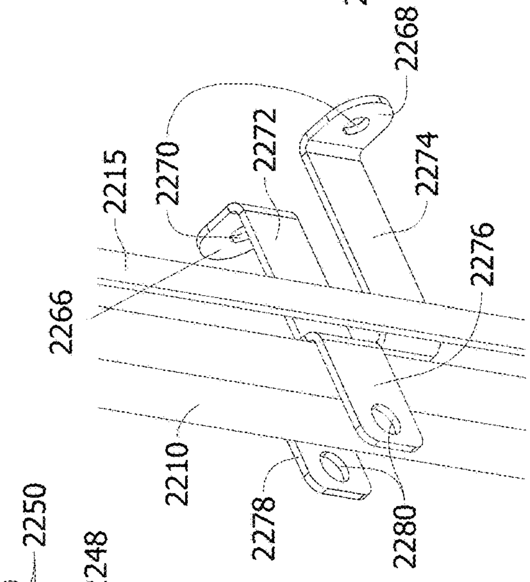
FIG. 23B shows a first securing bracket of the third example retention apparatus in accordance with another alternate embodiment of the disclosure.
Figure 23A:
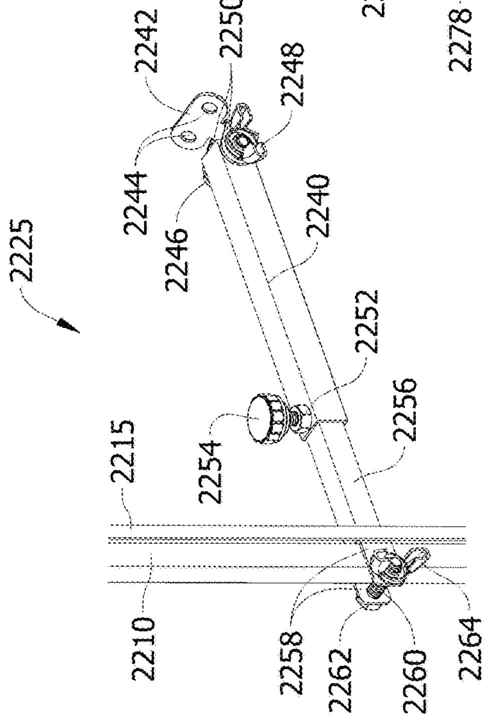
FIG. 23A shows a securing arm of the third example retention apparatus in accordance with another alternate embodiment of the disclosure.

FIG. 23A shows the securing arm 2225 in an example positional location along the shaft 2210 of the retention apparatus 2200. The securing arm 2225 may have a first securing arm member 2240 and a second securing arm member 2256. The securing arm 2225 may be telescopic in nature in that the second securing arm member 2256 may fit entirely within the first securing arm member 2240 in a retracted position. For use, and in an extended position, the first securing arm member 2240 may be pulled in one direction with the second securing arm member being coupled to the shaft 2210 or pulled in the opposite direction. In this fashion, the overall size of the securing arm 2225 can be adjusted based on the desired overall use of the user. To lock the securing arm 2225 in a desired position based on the adjusted location of each the first securing arm member 2240 and the second securing arm member 2256, an arm lock 2252 may be present. The arm lock 2252 may be a screw, bolt, or any other type of fastener to secure the desired position of the first securing arm member 2240 and the second securing arm member 2256. Further, the arm lock 2252 may be a threaded type of fastener to aid in the locking or securing of the first securing arm member 2240 and the second securing arm member 2256. Additionally, the arm lock 2252 may pass through an opening of the first securing arm member 2240 so that it can directly contact and create a secure frictional connection with the second securing arm member 2256. As viewed in FIG. 23A, some example embodiments may have an arm lock knob 2254 that may be rotationally actuated to adjust the position of the arm lock 2252 so that the overall position of the securing arm 2225 can be easily achieved.

The outer securing bracket 2242 may be adjustable in nature. Opposite the arm lock 2252 the other end of the first securing arm member 2240 may be coupled to an outer securing bracket 2242. The outer securing bracket 2242 may be able to affix or couple the overall securing arm 225 to a remote surface like a side of a marine vessel or possible remote wall structure. The attachable surface of the outer securing bracket 2242 may have a plurality of outer securing bracket openings 2244. The plurality of outer securing bracket openings 2244 may be openings through the attachable surface of the outer securing bracket 2242 and may be able to receive a screw, bolt, nail, stake, or any other type of fastener to secure the securing arm 2225 of the retention apparatus 2200 to the side of a marine vessel, remote wall structure, or any other structure. Also, an outer securing bracket arm connection 2250 may be present. The outer securing bracket arm connection 2250 may have a U type of configuration where a plurality of side surfaces may be present to encompass and cover opposite side surfaces of the first securing arm member 2240 to which the outer securing bracket arm connection 2250 may connect. To facilitate the connection between the outer securing bracket arm connection 2250 and the first securing arm member 2240 an outer securing bracket bolt 2246 may be present. The outer securing bracket bolt 2246 may be a screw, bolt, or any other type of fastener to secure the desired position of the outer securing bracket 2242 and first securing arm member 2240. Further, the outer securing bracket bolt 2246 may be a threaded type of fastener to aid in the locking or securing of the outer securing bracket 2242 and first securing arm member 2240. Additionally, the outer securing bracket bolt 2246 may pass through an opening of the first securing arm member 2240 so that it can directly connect to an outer securing bracket nut 2248. The outer securing bracket nut 2248 may be a wing nut so that the user can easily tighten or loosen the outer securing bracket bolt 2246 to create the secure frictional connection between the outer securing bracket 2242 and first securing arm member 2240.

Opposite the arm lock 2252 the other end of the second securing arm member 2256 may be coupled to the shaft 2210. A second securing arm connection 2258 may be present. The second securing arm connection 2258 may have a U type of configuration where a plurality of side surfaces may be present to encompass and cover opposite side surfaces of the shaft 2210 to which the second securing arm connection 2258 may connect. To facilitate the connection between the second securing arm connection 2258 and the shaft 2210 a securing bracket bolt 2260 may be present. The securing bracket bolt 2260 may be a screw, bolt, or any other type of fastener to secure the desired position of the second securing arm connection 2258 and the shaft 2210. Further, the securing bracket bolt 2260 may have a securing bracket bolt head 2262 and may be a threaded type of fastener to aid in the locking or securing of the second securing arm connection 2258 and the shaft 2210. Additionally, the securing bracket bolt 2260 may pass through an opening of the second securing arm connection 2258 so that it can directly connect to a securing bracket nut 2264. The securing bracket nut 2264 may be a wing nut so that the user can easily tighten or loosen the securing bracket bolt 2260 to create the secure frictional connection between the second securing arm connection 2258 and the shaft 2210.

FIG. 23A shows the first securing bracket 2230 in an example positional location along the shaft 2210 of the retention apparatus 2200. It should be understood that this positional location can be adjusted based on the desires and needs of the user. The first securing bracket 2230 may have a generally offset configuration wherein two sections of the first securing bracket 2230 create the first securing bracket 2230. A first securing bracket section may have a plurality of first securing bracket side walls 2272 and 2274. The plurality of first securing bracket side walls 2272 and 2274 may have a U type of configuration to facilitate easier attachment to a remote surface, wall, marine vessel, or the like. At the terminal ends of the plurality of first securing bracket side walls 2272 and 2274 remote from the shaft 2210, the plurality of first securing bracket side walls 2272 and 2274 may branch into a plurality of securing walls 2266 and 2268. Each of the plurality of securing walls 2266 and 2268 may be normal to the position of their respective plurality of first securing bracket side walls 2272 and 2274. The plurality of securing walls 2266 and 2268 may be on the same plane and axis to facilitate easier connection to a remote surface. The plurality of securing walls 2266 and 2268 may also have a plurality of securing wall openings 2270. Each the plurality of securing wall openings 2270 may be able to receive a screw, bolt, nail, stake, or any other type of fastener to secure the retention apparatus 2200 to a side wall, marine vessel, or other structure.

A second securing bracket section of the general offset nature of the first securing bracket 2230 may have a plurality of securing bracket upper side walls 2276 and 2278. The plurality of securing bracket upper side walls 2276 and 2278 may have a U type of configuration where the plurality of securing bracket upper side walls 2276 and 2278 may be present to encompass and cover opposite side surfaces of the shaft 2210 to which the first securing bracket 2230 may connect. To facilitate the connection between the plurality of securing bracket upper side walls 2276 and 2278 and the shaft 2210 a plurality of upper bracket openings 2280 may be present. Each of the plurality of upper bracket openings 2280 may be able to receive a screw, bolt, nail, stake, or any other type of fastener to secure the first securing bracket 2230 to the shaft 2210 in a similar fashion as described above.

FIG. 23C shows the second securing bracket 2235 in an example position near the terminal end of the shaft 2210 of the retention apparatus 2200. The second securing bracket 2235 may have a generally offset configuration wherein two sections of the second securing bracket 2235 create the second securing bracket 2235. A first securing bracket section may have a horizontal surface 2282 and a vertical surface 2284 that may be normal to the horizontal surface 2282. The horizontal surface 2282 may have a plurality of horizontal surface openings 2286. Each of the plurality of horizontal surface openings 2282 may be able to receive a screw, bolt, nail, stake, or any other type of fastener to secure the retention apparatus 2200 to a side wall, marine vessel, or other remote structure.

A second securing bracket section of the general offset nature of the second securing bracket 2235 may have a plurality of second bracket upper side walls 2288 and 2290. The plurality of second bracket upper side walls 2288 and 2290 may have a U type of configuration where the plurality of second bracket upper side walls 2288 and 2290 may be present to encompass and cover opposite side surfaces of the shaft 2210 to which the second securing bracket 2235 may connect. To facilitate the connection between the plurality of second bracket upper side walls 2288 and 2290 and the shaft 2210 a plurality of second upper bracket openings may be present holding a second securing bracket bolt 2292. The second securing bracket bolt 2292 may be a screw, bolt, or any other type of fastener to secure the desired position of the plurality of second bracket upper side walls 2288 and 2290 and the shaft 2210. Further, the second securing bracket bolt 2292 may have a threaded type of fastener configuration to aid in the locking or securing of the plurality of second bracket upper side walls 2288 and 2290 and the shaft 2210. Additionally, the second securing bracket bolt 2292 may pass through the plurality of second upper bracket openings so that it can directly connect to a second securing bracket nut 2294. The second securing bracket nut 2294 may be a wing nut so that the user can easily tighten or loosen the second securing bracket bolt 2292 to create the secure frictional connection between the plurality of second bracket upper side walls 2288 and 2290 and the shaft 2210.

Figure 24:
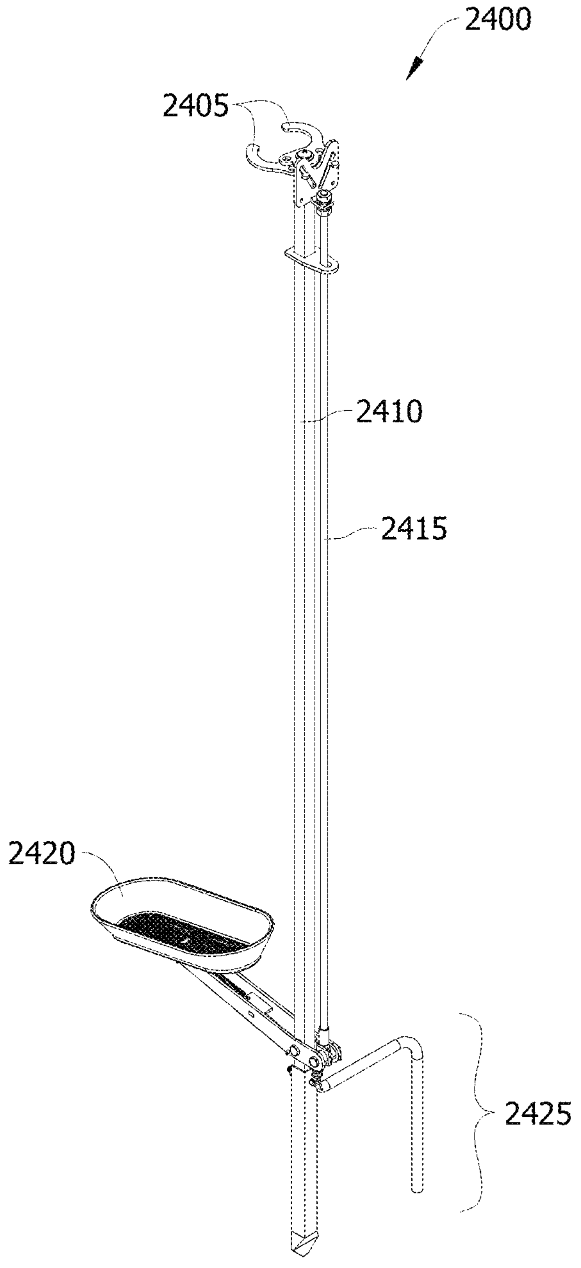
FIG. 24 illustrates a fourth example retention apparatus in accordance with another alternate embodiment of the disclosure.

FIG. 24 illustrates a fourth embodiment of the retention apparatus 2400. In FIG. 24, the retention apparatus 2400 is illustrated in an open position. The retention apparatus 2400, as discussed earlier, may have a plurality of portion like sections. A top portion may employ a grasping mechanism 2405 in part coupled to a back plate. The grasping mechanism 2405 is a component of the retention apparatus 2400 that can secure a top end 125 of the elongated instrument 120 to the retention apparatus 2400. The grasping mechanism 2405 is envisioned to have multiple diverse types of configurations or possible designs. However, the grasping mechanism 2405 should be able to operate with the other components of the retention apparatus 2400 so that any desired elongated instrument 120 can be secured by the grasping mechanism 2405. The grasping mechanism 2405 with the back plate can actuate between an open and closed position based on the retention apparatus 2400 being in either its open position or securing position. The retention apparatus 2400 may also have a shaft 2410 and a rod 2415 present within the middle portion of the retention apparatus 2400. Further, the bottom portion of the retention apparatus may have a receptacle 2420. The retention apparatus 2400 should be understood to have the same or similar functionality as the earlier retention apparatus 100 discussed above. Also present with the retention apparatus 2400 is a securing base 2425. The securing base 2425 also allows the user to directly couple or affix the retention apparatus to any surface or ground location suitable for the component of the securing base 2425 to enter and be held by the surface or ground.

Figure 25:
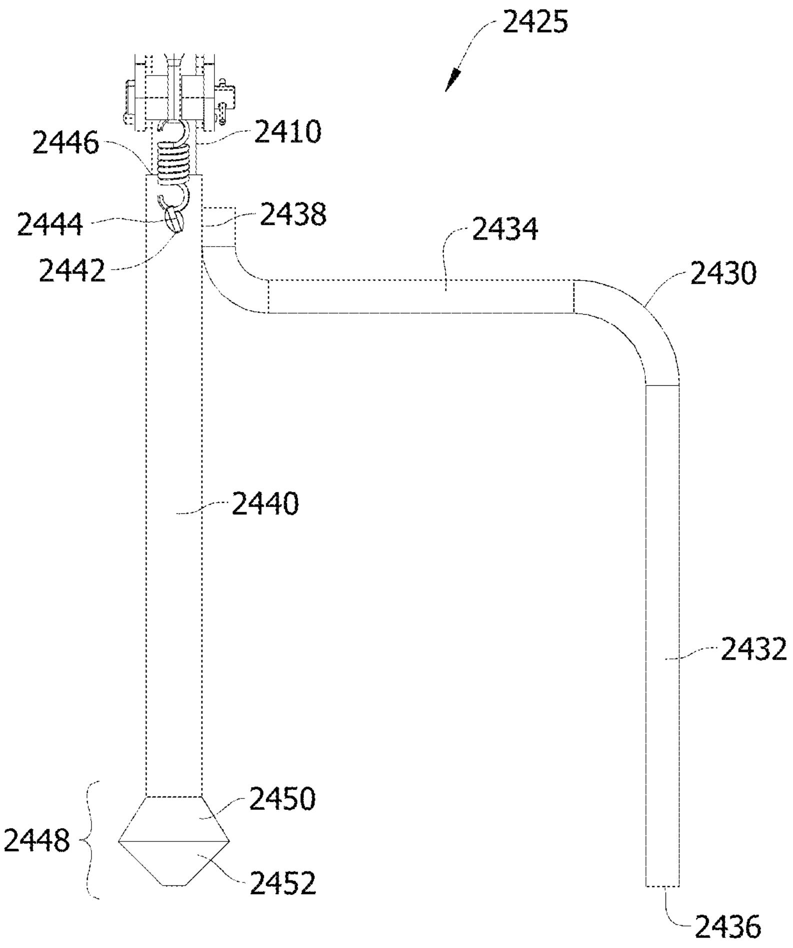
FIG. 25 shows a securing base portion of the fourth example retention apparatus in accordance with another alternate embodiment of the disclosure.

FIG. 25 illustrates the securing base 2425 that may be used with the retention apparatus 2400. The securing base 2425 may have a plurality of prong elements that can enter and be secured by a ground or surface area that is suitable for the securing base 2425. This may include earth type surfaces, including grass, dirt, gravel, mud, clay, or the like. The securing base 2425 may have a first prong 2430. The first prong 2430 may have a horizontal section 2434 and a vertical section 2432. The termination lower surface of the vertical section may be a flat lower surface 2436. The securing base 2425 may also have a second prong 2440. The first prong 2430 may meet the second prong 2440 at connection point 2438. Connection point 2438 may be a weld or a point between the first prong 2430 and the second prong 2440 if the entire securing base 2425 is created by the same common single piece of material. The second prong 2440 may have a surface entering end 2448. The surface entering end 2448 may have an upper end 2450 and a lower end 2452. The entire surface entering end 2448 may have a larger perimeter than the second prong 2440. The upper end 2450 of the surface entering end 2448 may be pyramidal in shape, but other possible shapes and configurations are envisioned. The upper end 2450 of the surface entering end 2448 may extend outward from each side wall of the second prong 2440 to create this larger perimeter. At an apex point, the upper end 2450 can transition to the lower end 2452 of the surface entering end 2448. The lower end 2452 of the surface entering end 2448 may be pyramidal in shape as well, but other possible shapes and configurations are envisioned. The lower end 2452 of the surface entering end 2448 may extend inward from the apex point on each side of the upper end 2450. As the previous larger perimeter decreases, the lower end 2452 may terminate at an entry point to ease positioning the surface entering end 2448 into the ground or surface as desired by the user.

The second prong 2440 of the securing base 2425 may also have an upper end. The upper end of the second prong 2440 may have a hollow interior area. The hollow interior area may travel a length of second prong 2440 and may be able to fit and secure the shaft 2410 through a securing base opening 2446. To facilitate attachment shaft 2410 and the retention apparatus 2400 overall, the upper end of the second prong 2440 may have a shaft securing opening 2442. The shaft securing opening 2442 may have a bolt 2444 that can pass through and be secured to each the shaft 2410 and the second prong 2440. The bolt 2062 may be one of the attaching points of a grasping force mechanism while the other end may attach to one of the arms of the bottom portion of the retention apparatus 2400. During operational use, a user may apply a force onto the vertical section 2434 of the first prong 2430 so that the entire securing base 2425 can be pushed into and secured by the ground or other surface desired by the user.

Figure 26:
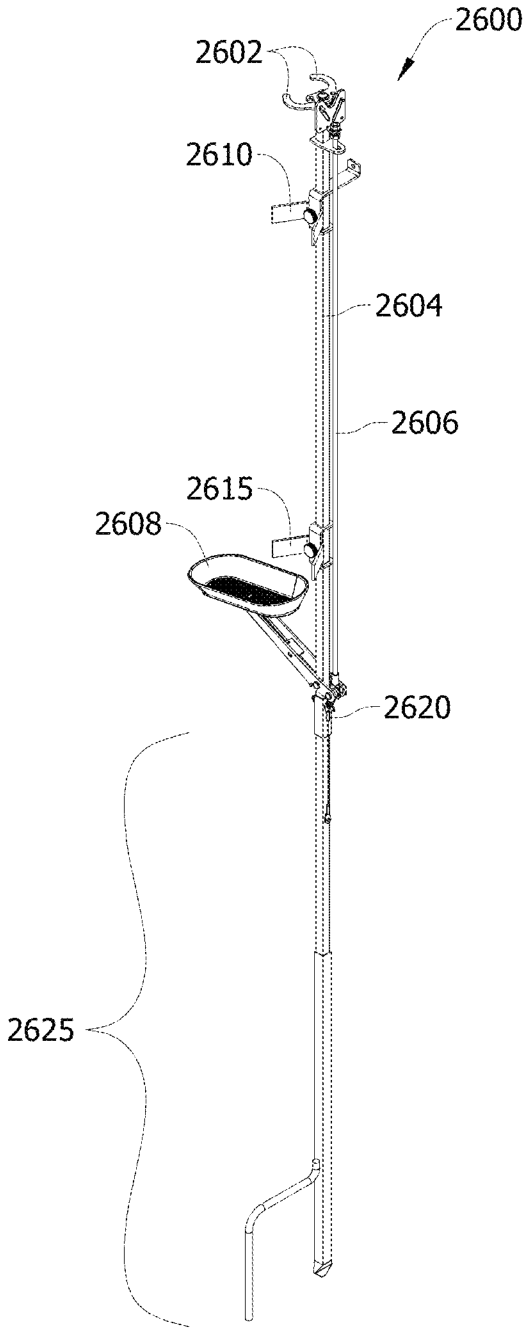
FIG. 26 illustrates a fifth example retention apparatus in accordance with another alternate embodiment of the disclosure.

FIG. 26 illustrates a fifth embodiment of the retention apparatus 2600. In FIG. 26, the retention apparatus 2600 is illustrated in an open position. The retention apparatus 2600, as discussed earlier, may have a plurality of portion like sections. A top portion may employ a grasping mechanism 2602 in part coupled to a back plate. The grasping mechanism 2602 is a component of the retention apparatus 2600 that can secure a top end 125 of the elongated instrument 120 to the retention apparatus 2600. The grasping mechanism 2602 is envisioned to have multiple diverse types of configurations or possible designs. However, the grasping mechanism 2602 should be able to operate with the other components of the retention apparatus 2600 so that any desired elongated instrument 120 can be secured by the grasping mechanism 2602. The grasping mechanism 2602 with the back plate can actuate between an open and closed position based on the retention apparatus 2600 being in either its open position or securing position. The retention apparatus 2600 may also have a shaft 2604 and a rod 2606 present within the middle portion of the retention apparatus 2600. Further, the bottom portion of the retention apparatus may have a receptacle 2608. The retention apparatus 2600 should be understood to have the same or similar functionality as the earlier retention apparatus 100 discussed above. Also present with the retention apparatus 2600 is a first securing bracket 2610, a second securing bracket 2615, a connector 2620, and a securing base 2625. The securing base 2625 allows the user to directly couple or affix the retention apparatus to any surface or ground location suitable for the component of the securing base 2625 to enter and be held by the surface or ground.

Figure 27C:
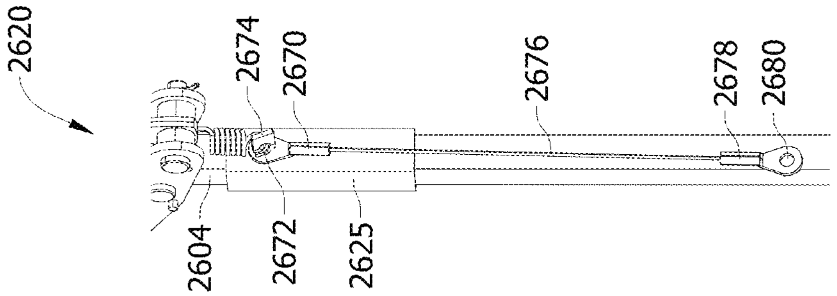
FIG. 27C shows a connector of the fifth example retention apparatus in accordance with another alternate embodiment of the disclosure.
Figure 27B:
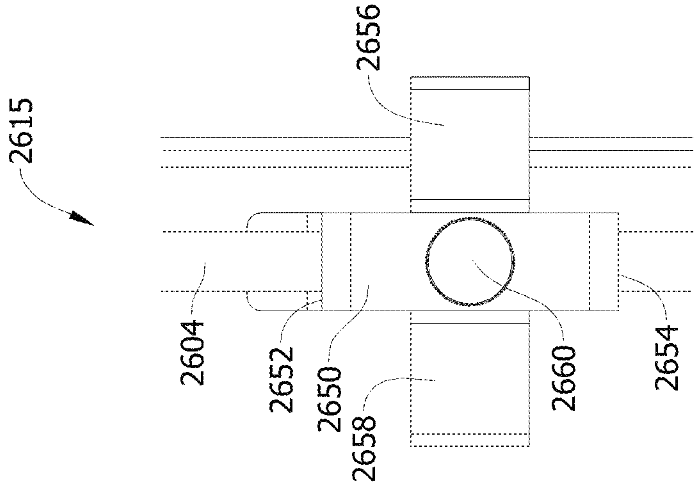
FIG. 27B shows a second securing bracket of the fifth example retention apparatus in accordance with another alternate embodiment of the disclosure.
Figure 27A:
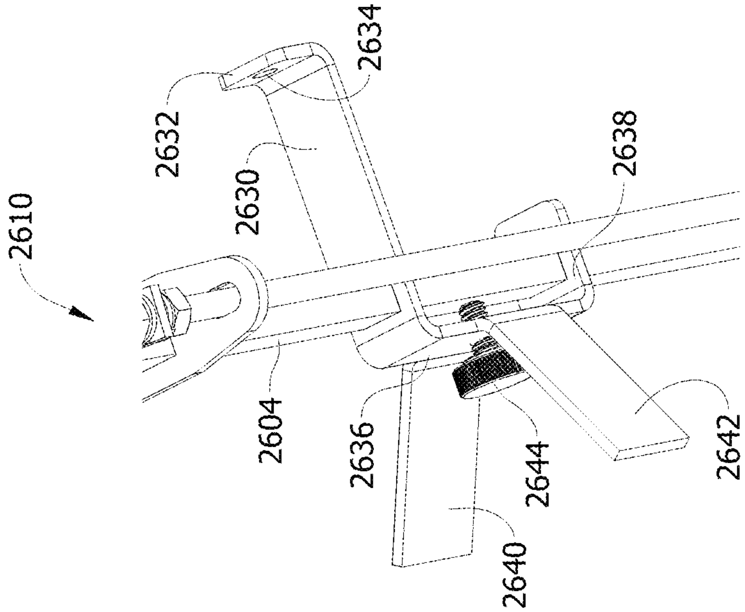
FIG. 27A shows a first securing bracket of the fifth example retention apparatus in accordance with another alternate embodiment of the disclosure.

FIG. 27A shows the first securing bracket 2610 in an example position near the grasping mechanism 2602 of the retention apparatus 2600. The first securing bracket 2610 may have a plurality of first securing bracket openings through a top surface 2630 of the first securing bracket 2610 and a bottom surface 2638 of the first securing bracket 2610. A shaft 2604 of the retention apparatus 2600 may fit within and through this plurality of first securing bracket openings. In some embodiments, the first securing bracket 2610 may be directly secured, affixed, or welded to the shaft 2604. The top surface 2630 of the first securing bracket 2610 may be horizontal and then extend upwards as a vertical surface 2632 that may be normal to the horizontal position of the top surface 2630. The vertical surface 2632 may have a vertical surface opening 2634. The vertical surface opening 2634 may be able to receive a screw, bolt, nail, stake, or any other type of fastener to secure the retention apparatus 2600 to a side wall or other structure.

Further the first securing bracket 2610 may have a front surface 2636 and a first extension arm 2640 and a second extension arm 2642. The first securing bracket 2610 viewed in this figure may be employed when it is ideal to secure the retention apparatus 2600 to a non-uniform structure or to a structure where direct connection with a securing type of fastener would not be ideal or possible. The first extension arm 2640 may extend outward at an angle away from the front surface 2636 and outward relative to the shaft 2604. The second extension arm 2642 may also extend outward at an angle away from the front surface 2636 and outward relative to the shaft 2604. The outward extension of each the first extension arm 2640 and the second extension arm 2642 allows the first securing bracket 2610 to be able to accommodate securing the overall retention apparatus 2600 to these types of non-uniform structures or to structures where direct connection with a securing type of fastener would not be ideal or possible. Additionally, the locational position of the first securing bracket 2610 can be adjusted along the shaft 2604 of the retention apparatus 2600. Once a select position is decided by the user, a first bracket fastener 2644 can be used to secure the first securing bracket 2610 into the desired location. The first bracket fastener 2644 may be a large screw threaded through the first securing bracket 2610 to allow it to frictionally engage with the shaft 2604 at the desired location along the shaft 2604 to secure it into position.

FIG. 27B shows the second securing bracket 2615 in an example position along the shaft 2604 of the retention apparatus 2600. The second securing bracket 2615 may have a plurality of second securing bracket openings through a top surface 2652 of the second securing bracket 2615 and a bottom surface 2654 of the second securing bracket 2615. A shaft 2604 of the retention apparatus 2600 may fit within and through this plurality of second securing bracket openings. In some embodiments, the second securing bracket 2615 may be directly secured, affixed, or welded to the shaft 2604.

Further the second securing bracket 2615 may have a front surface 2650 and a first extension arm 2658 and a second extension arm 2656. The second securing bracket 2615 viewed in this figure may be employed when it is ideal to secure the retention apparatus 2600 to a non-uniform structure or to a structure where direct connection with a securing type of fastener would not be ideal or possible. The first extension arm 2658 may extend outward at an angle away from the front surface 2650 and outward relative to the shaft 2604. The second extension arm 2656 may also extend outward at an angle away from the front surface 2650 and outward relative to the shaft 2604. The outward extension of each the first extension arm 2658 and the second extension arm 2656 allows the second securing bracket 2615 to be able to accommodate securing the overall retention apparatus 2600 to these types of non-uniform structures or to structures where direct connection with a securing type of fastener would not be ideal or possible. Additionally, the locational position of the second securing bracket 2615 can be adjusted along the shaft 2604 of the retention apparatus 2600. Once a select position is decided by the user, a second bracket fastener 2660 can be used to secure the second securing bracket 2615 into the desired location. The second bracket fastener 2660 may be a large screw threaded through the second securing bracket 2615 to allow it to frictionally engage with the shaft 2604 at the desired location along the shaft 2604 to secure it into position.

FIG. 27C shows a connector 2676 (also viewed as 2620) in an example position as a component part of the retention apparatus 2600. The connector 2676 (also viewed as 2620) may have a first connector end 2670 and a second connector end 2678. The second connector end 2678 may have a second end opening 2680 through which other components of or outside of the retention apparatus 2600 may connect. The first connector end 2670 may be secured to the retention apparatus 2600 through the first connector opening 2672. A securing base 2625 may have a bolt opening where a bolt 2674 can pass through and be secured to each the shaft 2604 and the first connector opening 2672. The bolt 2674 may be one of the attaching points of a grasping force mechanism while the other end may attach to one of the arms of the bottom portion of the retention apparatus 2600.

Figure 28A:
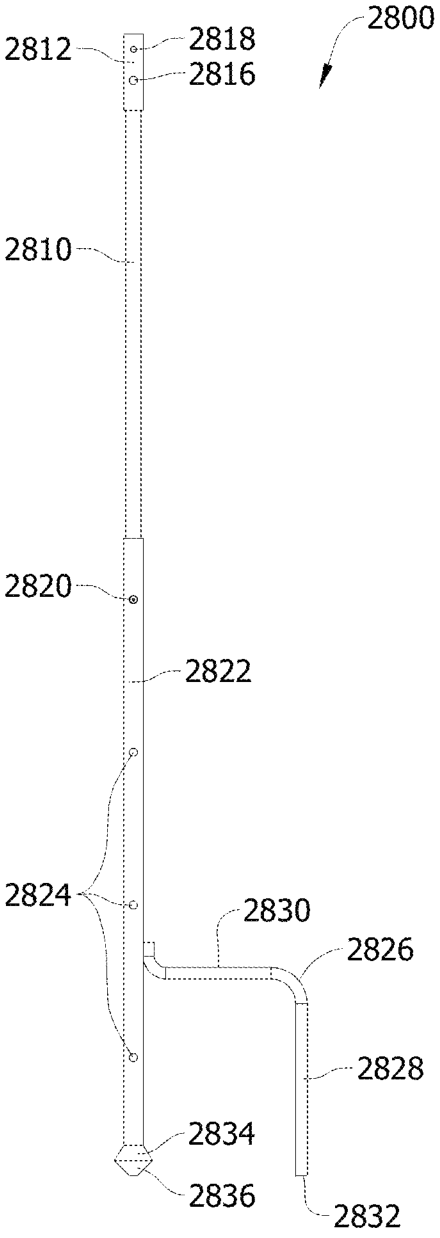
FIG. 28A shows a securing base portion of the fifth example retention apparatus in an extended position in accordance with another alternate embodiment of the disclosure.
Figure 28B:
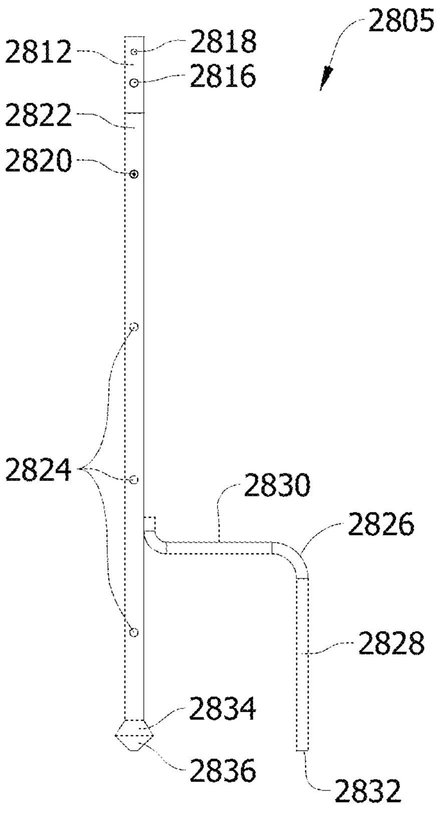
FIG. 28B shows the securing base portion of the fifth example retention apparatus in a retracted position in accordance with another alternate embodiment of the disclosure.

FIGS. 28A and 28B illustrate the securing base 2625 that may be used with the retention apparatus 2600. The securing base 2625 may have an extended position 2800 and a retracted position 2805. The securing base 2625 illustrated in FIG. 28A is in the extended position, while the securing base 2625 illustrated in FIG. 28B is in the retracted position. The user may be able to adjust the overall length of the securing base 2625 into intermediate positions as well based on the environment the user encounters for the retention apparatus 2600. The securing base 2425 may have a plurality of prong elements that can enter and be secured by a ground or surface area that is suitable for the securing base 2625. This may include earth type surfaces, including grass, dirt, gravel, mud, clay, or the like. The securing base 2625 may have a first prong 2826. The first prong 2826 may have a horizontal section 2830 and a vertical section 2828. The termination lower surface of the vertical section 2828 may be a flat lower surface 2832. The securing base 2625 may also have a second prong 2822. The first prong 2826 may meet the second prong 2826 at a connection point. Connection point may be a weld or the like between the first prong 2826 and the second prong 2822 or the entire securing base 2625 may be created by the same common single piece of material. The second prong 2822 may have a lower surface entering end. The surface entering end may have an upper end 2834 and a lower end 2836. The entire surface entering end may have a larger perimeter than the second prong 2822. The upper end 2834 of the surface entering end may be pyramidal in shape, but other possible shapes and configurations are envisioned. The upper end 2834 of the surface entering end may extend outward from each side wall of the second prong 2822 to create this larger perimeter. At an apex point, the upper end 2834 can transition to the lower end 2836 of the surface entering end. The lower end 2836 of the surface entering end may be pyramidal in shape as well, but other possible shapes and configurations are envisioned. The lower end 2836 of the surface entering end may extend inward from the apex point on each side of the upper end 2834. As the previous larger perimeter decreases, the lower end 2836 may terminate at an entry point to ease positioning the surface entering end into the ground or surface as desired by the user.

The second prong 2822 of the securing base 2625 may also have an upper end. The upper end of the second prong 2822 may have a shaft holder 2812 with a hollow interior area. The hollow interior area may travel a length of shaft holder 2812 and may be able to fit and secure the shaft 2604. To facilitate attachment, the shaft holder 2812 may have a shaft securing opening 2818. The shaft securing opening 2818 may have a bolt that can pass through and be secured to each the shaft 2604 and the shaft holder 2812. During operational use, a user may apply a force onto the vertical section 2434 of the first prong 2430 so that the entire securing base 2425 can be pushed into and secured by the ground or other surface desired by the user.

The second prong 2822 of the securing base 2625 may also have an arm extension 2810. The arm extension may in some embodiments be a common piece of material with the shaft holder 2812, but in other embodiments it may be a standalone piece of material. As a stand long material piece, the arm extension 2810 may have an upper tab 2816. The upper tab 2816 may fit into and be secured within an upper tab opening that is present on the shaft holder 2812. The arm extension 2810 may also have a lower tab 2820. The lower tab 2820 may fit into and be secured within a plurality of lower tab openings 2824 that may be present on the second prong 2822. In this fashion and manner, the user can adjust or change the overall length of the securing base 2625 so that it best fits the environment in which the retention apparatus 2600 is employed.

Figure 29:
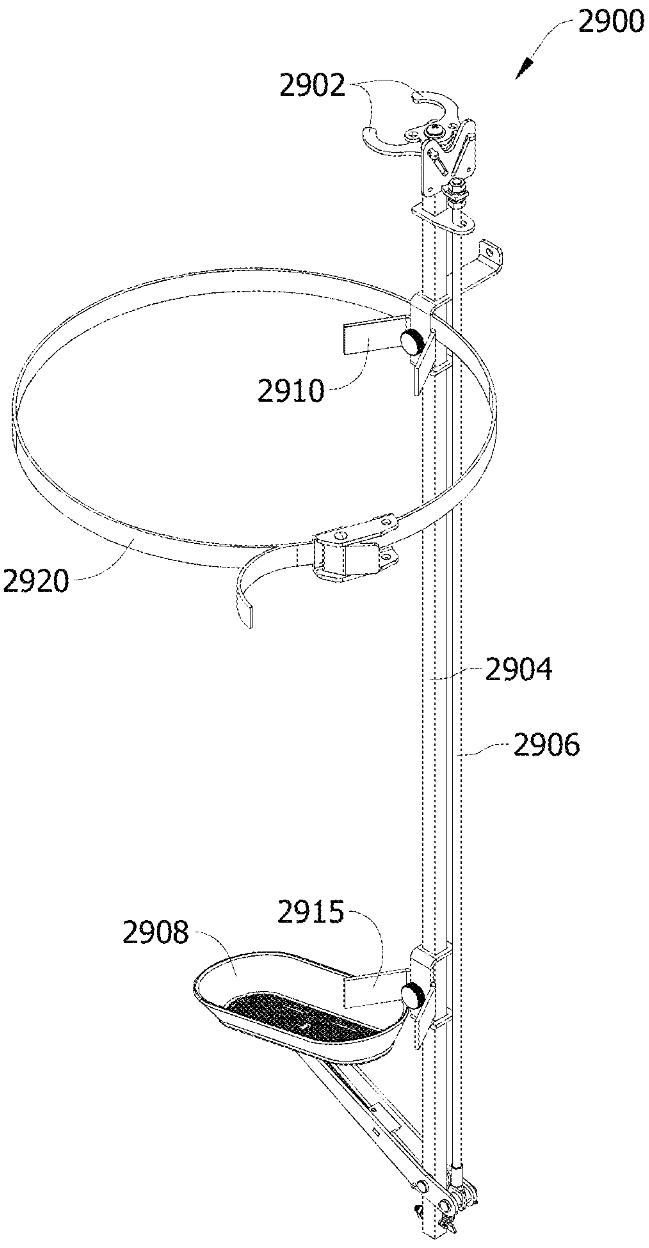
FIG. 29 illustrates a sixth example retention apparatus in accordance with another alternate embodiment of the disclosure.

FIG. 29 illustrates a sixth embodiment of the retention apparatus 2900. In FIG. 29, the retention apparatus 2900 is illustrated in an open position. The retention apparatus 2900, as discussed earlier, may have a plurality of portion like sections. A top portion may employ a grasping mechanism 2902 in part coupled to a back plate. The grasping mechanism 2902 is a component of the retention apparatus 2900 that can secure a top end 125 of the elongated instrument 120 to the retention apparatus 2900. The grasping mechanism 2902 is envisioned to have multiple diverse types of configurations or possible designs. However, the grasping mechanism 2902 should be able to operate with the other components of the retention apparatus 2900 so that any desired elongated instrument 120 can be secured by the grasping mechanism 2902. The grasping mechanism 2902 with the back plate can actuate between an open and closed position based on the retention apparatus 2900 being in either its open position or securing position. The retention apparatus 2900 may also have a shaft 2904 and a rod 2906 present within the middle portion of the retention apparatus 2900. Further, the bottom portion of the retention apparatus may have a receptacle 2908. The retention apparatus 2900 should be understood to have the same or similar functionality as the earlier retention apparatus 100 discussed above. Also present with the retention apparatus 2900 is a first securing bracket 2910, a second securing bracket 2915, and a strap connection 2920. The strap connection 2920 may be employed when it is ideal to secure the retention apparatus 2900 to a non-uniform structure, such as a tree, or to a structure where direct connection with a securing type of fastener would not be ideal or possible.

Figure 30A:
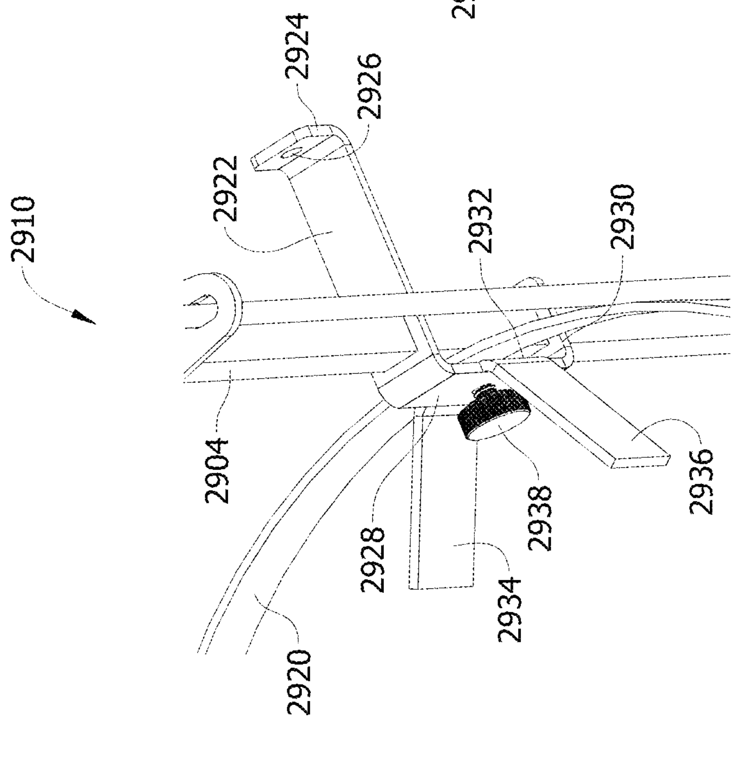
FIG. 30A shows a first securing bracket of the sixth example retention apparatus in accordance with another alternate embodiment of the disclosure.

FIG. 30A shows the first securing bracket 2910 in an example position near the grasping mechanism 2902 of the retention apparatus 2900. The first securing bracket 2910 may have a plurality of first securing bracket openings through a top surface 2922 of the first securing bracket 2910 and a bottom surface 2930 of the first securing bracket 2910. A shaft 2904 of the retention apparatus 2900 may fit within and through this plurality of first securing bracket openings. In some embodiments, the first securing bracket 2910 may be directly secured, affixed, or welded to the shaft 2904. The top surface 2922 of the first securing bracket 2910 may be horizontal and then extend upwards as a vertical surface 2924 that may be normal to the horizontal position of the top surface 2922. The vertical surface 2924 may have a vertical surface opening 2926. The vertical surface opening 2926 may be able to receive a screw, bolt, nail, stake, or any other type of fastener to secure the retention apparatus 2900 to a side wall or other structure.

Further the first securing bracket 2910 may have a front surface 2928 and a first extension arm 2934 and a second extension arm 2936. The first securing bracket 2910 viewed in this figure may be employed when it is ideal to secure the retention apparatus 2900 to a non-uniform structure or to a structure where direct connection with a securing type of fastener would not be ideal or possible. The first extension arm 2934 may extend outward at an angle away from the front surface 2928 and outward relative to the shaft 2904. The second extension arm 2936 may also extend outward at an angle away from the front surface 2928 and outward relative to the shaft 2904. The outward extension of each the first extension arm 2934 and the second extension arm 2936 allows the first securing bracket 2910 to be able to accommodate securing the overall retention apparatus 2900 to these types of non-uniform structures or to structures where direct connection with a securing type of fastener would not be ideal or possible. Additionally, the locational position of the first securing bracket 29100 can be adjusted along the shaft 2904 of the retention apparatus 2900. Once a select position is decided by the user, a first bracket fastener 2938 can be used to secure the first securing bracket 2910 into the desired location. The first bracket fastener 2938 may be a large screw threaded through the first securing bracket 2910 to allow it to frictionally engage with the shaft 2904 at the desired location along the shaft 2904 to secure it into position. Further a first bracket opening 2932 may be present. The first bracket opening allows for the strap connection to be positioned and possibly secured between the first securing bracket 2910 and the shaft 2904.

Figure 30B:
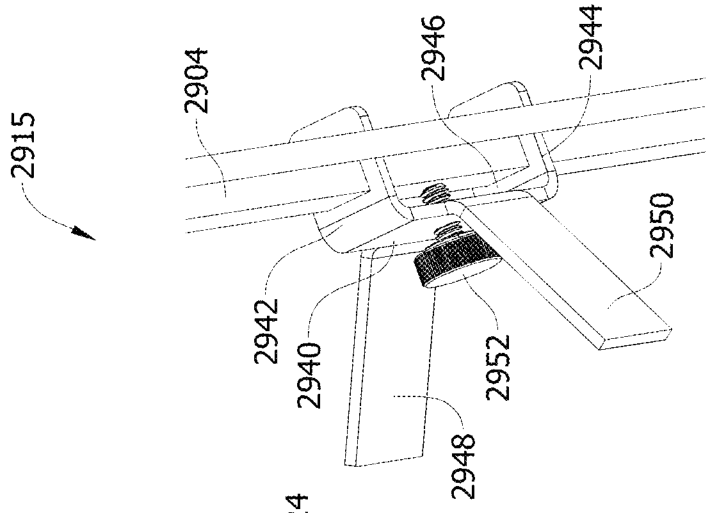
FIG. 30B shows a second securing bracket of the sixth example retention apparatus in accordance with another alternate embodiment of the disclosure.

FIG. 30B shows the second securing bracket 2915 in an example position along the shaft 2904 of the retention apparatus 2900. The second securing bracket 2915 may have a plurality of second securing bracket openings through a top surface 2942 of the second securing bracket 2915 and a bottom surface 2944 of the second securing bracket 2915. A shaft 2904 of the retention apparatus 2900 may fit within and through this plurality of second securing bracket openings. In some embodiments, the second securing bracket 2915 may be directly secured, affixed, or welded to the shaft 2904.

Further the second securing bracket 2915 may have a front surface 2940 and a first extension arm 2948 and a second extension arm 2950. The second securing bracket 2915 viewed in this figure may be employed when it is ideal to secure the retention apparatus 2900 to a non-uniform structure or to a structure where direct connection with a securing type of fastener would not be ideal or possible. The first extension arm 2948 may extend outward at an angle away from the front surface 2940 and outward relative to the shaft 2904. The second extension arm 2950 may also extend outward at an angle away from the front surface 2940 and outward relative to the shaft 2904. The outward extension of each the first extension arm 2948 and the second extension arm 2950 allows the second securing bracket 2915 to be able to accommodate securing the overall retention apparatus 2900 to these types of non-uniform structures or to structures where direct connection with a securing type of fastener would not be ideal or possible. Additionally, the locational position of the second securing bracket 2915 can be adjusted along the shaft 2904 of the retention apparatus 2900. Once a select position is decided by the user, a second bracket fastener 2952 can be used to secure the second securing bracket 2915 into the desired location. The second bracket fastener 2952 may be a large screw threaded through the second securing bracket 2915 to allow it to frictionally engage with the shaft 2904 at the desired location along the shaft 2904 to secure it into position. Further a second bracket opening 2946 may be present. The second bracket opening 2946 allows for the strap connection 2920 to be positioned and possibly secured between the second securing bracket 2915 and the shaft 2904.

Figure 30C:
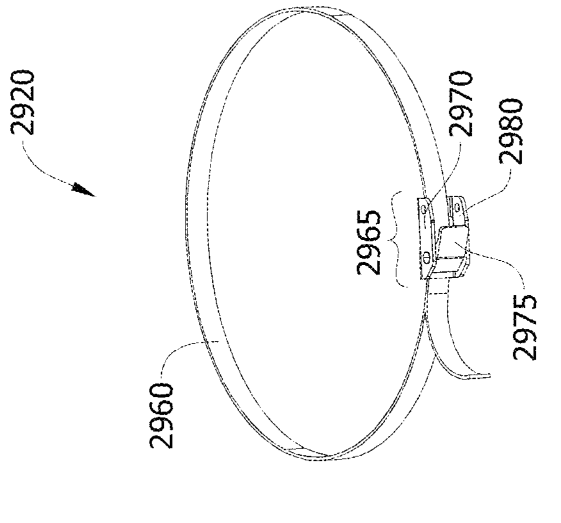
FIG. 30C shows a strap used with securing the sixth example retention apparatus in accordance with another alternate embodiment of the disclosure.

FIG. 30C illustrates the strap connection 2920 that can be used with the retention apparatus 2900. The strap connection 2920 may be employed when it is ideal to secure the retention apparatus 2900 to a non-uniform structure, such as a tree, or to a structure where direct connection with a securing type of fastener would not be ideal or possible. The strap connection 2920 may include a strap 2960 that is adjustable in nature. The strap 2960 may be made of any type of material or fabric that is durable and can secure the retention apparatus 2900 when utilized. The strap 2960 may be secured by a connector 2965. The connector may be formed by a buckle top end 2970 and a buckle bottom end 2980 that can guide the strap 2960. Further, a connector lock 2975 can be actuated to lock a selected position of the strap 2960 to be secured within the strap connection 2920.

The embodiments were chosen and described in order to best explain the principles of the invention and its practical application to thereby enable others skilled in the art to best utilize the invention in various embodiments and with various modifications as are suited to the particular use contemplated.

As various modifications could be made in the construction and method herein described and illustrated without departing from the scope of the invention, it is intended that all matter contained in the foregoing description or shown in the accompanying drawings shall be interpreted as illustrative rather than limiting. For example, the overall configuration of the retention apparatus, the brackets used with the retention apparatus, and diverse types of base elements may be employed but can achieve the same functionality of the underlying invention. Thus, the breadth and scope of the present invention should not be limited by any of the above-described example embodiments but should be defined only in accordance with the following claims appended hereto and their equivalents.

What is claimed is:

1. A retention apparatus comprising:

a shaft;

a rod;

a grasping mechanism having an open position and a closed position, the grasping mechanism coupled to a top end of the shaft and in operative communication with the rod;

a receptacle having a first position and a second position, the receptacle coupled in operative communication with the shaft and rod; and wherein movement of the receptacle from the first position to the second position actuates movement of the grasping mechanism from the open position to the closed position;

wherein the grasping mechanism has a plurality of clasps that includes a first clasp and a second clasp;

wherein the grasping mechanism includes a back plate, the back plate in operative communication with each of the first clasp and the second clasp;

wherein the back plate has a first back plate channel and a second back plate channel, a portion of the first clasp positioned through the first back plate channel and a portion of the second clasp positioned through the second back plate channel;

wherein a location of the first back plate channel is positionally offset in relation to a location of the second back plate channel on the back plate; and wherein a horizontal movement by the first clasp and the second clasp to create a confinement space in the closed position is a linear movement of the portion of the first clasp within the first back plate channel to a closed first clasp location and a linear movement of the portion of the second clasp within the second back plate channel to a closed second clasp location.

2. The retention apparatus of claim 1, wherein when the grasping mechanism is in the closed position, the first clasp and the second clasp actuate a horizontal movement to create a confinement space to secure an instrument.

3. The retention apparatus of claim 1, further comprising: a grasping force mechanism, the grasping force mechanism in operative communication with the receptacle, the rod, and the back plate of the grasping mechanism; and wherein the grasping force mechanism maintains the grasping mechanism in the open position until movement of the receptacle from the first position to the second position.

4. A retention apparatus comprising:

a shaft;

a rod;

a grasping mechanism, the grasping mechanism coupled to a top end of the shaft and in operative communication with the rod;

a grasping force mechanism, the grasping force mechanism in operative communication with the rod and the grasping mechanism;

a receptacle, the receptacle coupled in operative communication with the shaft, the rod, and the grasping force mechanism; and wherein the grasping force mechanism is adjustable to transfer a positional force to the grasping mechanism to secure an instrument;

and further comprising:

a plurality of arms, the plurality of arms removably attached to the receptacle at a first end of each of the plurality of arms, and removably attached to the rod at a second end of each of the plurality of arms; and wherein the plurality of arms are pivotably attached to the shaft between each the first end and the second of the plurality of arms.

5. The retention apparatus of claim 4, wherein the grasping force mechanism is removable attachable to the second end of one of the plurality of arms and a base component coupled to the shaft.

6. The retention apparatus of claim 5, wherein the grasping force mechanism is a spring.

7. The retention apparatus of claim 5, wherein the base component is a base bolt.

8. The retention apparatus of claim 4, further comprising:

a receptacle force mechanism, the receptacle force mechanism in operative communication with the receptacle and an arm connector positioned between the plurality of arms; and wherein the receptacle force mechanism is adjustable to transfer a positional force to the receptacle to horizontally position the instrument when placed within the receptacle.

9. The retention apparatus of claim 8, wherein the receptacle force mechanism is a spring.

* * * * *